US012532192B2

(12) United States Patent
Imran et al.

(10) Patent No.: US 12,532,192 B2
(45) Date of Patent: Jan. 20, 2026

(54) PROACTIVE MOBILE NETWORK OPTIMIZATION

(71) Applicant: The Board of Regents of the University of Oklahoma, Norman, OK (US)

(72) Inventors: Ali Imran, Bixby, OK (US); Hasan Farooq, Tulsa, OK (US); Ahmad Asghar, Seattle, WA (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 656 days.

(21) Appl. No.: 17/617,505

(22) PCT Filed: Jun. 11, 2020

(86) PCT No.: PCT/US2020/037205
§ 371 (c)(1),
(2) Date: Dec. 8, 2021

(87) PCT Pub. No.: WO2021/011131
PCT Pub. Date: Jan. 21, 2021

(65) Prior Publication Data

US 2022/0225127 A1 Jul. 14, 2022

Related U.S. Application Data

(60) Provisional application No. 62/875,841, filed on Jul. 18, 2019.

(51) Int. Cl.
*H04W 24/02* (2009.01)
*H04B 17/309* (2015.01)
*H04W 36/32* (2009.01)

(52) U.S. Cl.
CPC .......... *H04W 24/02* (2013.01); *H04B 17/309* (2015.01); *H04W 36/322* (2023.05)

(58) Field of Classification Search
USPC ....... 370/229, 230, 235, 241, 252, 254, 255, 370/311, 328, 329, 330, 331, 332
See application file for complete search history.

(56) References Cited

U.S. PATENT DOCUMENTS 9,332,498 B2 5/2016 Nylander et al.
9,461,917 B1 10/2016 Liu et al.
(Continued)

FOREIGN PATENT DOCUMENTS

CN 103906211 A 7/2014
CN 104168634 A 11/2014
(Continued)

OTHER PUBLICATIONS

PCT International Search Report and PCT Written Opinion of the International Searching Authority; Application No. PCT/US2020/037205; Sep. 24, 2020; 21 pages.
(Continued)

*Primary Examiner* — Nguyen H Ngo
(74) *Attorney, Agent, or Firm* — Conley Rose, P.C.

(57) ABSTRACT

An apparatus comprises: a memory; and a processor coupled to the memory and configured to: build a prediction model that predicts next cells of UEs in a future time step of a mobile network; map the next cells to future user locations; determine future loads of BSs in the mobile network based on the future user locations; determine an optimization of the mobile network using the future loads; and implement the optimization by instructing the BSs to adjust a parameter in the future time step.

21 Claims, 16 Drawing Sheets

(56) References Cited

U.S. PATENT DOCUMENTS

| | | | | |
|---|---|---|---|---|
| 2012/0039226 | A1 | 2/2012 | Yang et al. | |
| 2013/0021962 | A1 | 1/2013 | Hu et al. | |
| 2013/0045740 | A1 | 2/2013 | Gayde et al. | |
| 2013/0090122 | A1* | 4/2013 | Karla | H04W 24/02 455/450 |
| 2013/0163463 | A1 | 6/2013 | Grayson et al. | |
| 2013/0310048 | A1 | 11/2013 | Hunukumbure et al. | |
| 2014/0043966 | A1 | 2/2014 | Lee et al. | |
| 2014/0179332 | A1 | 6/2014 | Qian et al. | |
| 2014/0269364 | A1 | 9/2014 | Knapp et al. | |
| 2015/0023163 | A1 | 1/2015 | Gonzalez et al. | |
| 2015/0189533 | A1 | 7/2015 | Fehske et al. | |
| 2016/0192238 | A1 | 6/2016 | Papadopoulos et al. | |
| 2016/0278038 | A1 | 9/2016 | Larsson et al. | |
| 2016/0380820 | A1* | 12/2016 | Horvitz | H04W 16/28 370/254 |
| 2018/0035336 | A1* | 2/2018 | Wang | H04W 8/18 |
| 2018/0132225 | A1* | 5/2018 | Hayes | H04W 24/02 |
| 2019/0140908 | A1* | 5/2019 | Ma | H04L 43/10 |
| 2019/0319868 | A1* | 10/2019 | Svennebring | H04W 24/08 |

FOREIGN PATENT DOCUMENTS

| | | | |
|---|---|---|---|
| EP | 2728926 | A1 | 5/2014 |
| WO | 2014036710 | A1 | 3/2014 |
| WO | 2017000557 | A1 | 1/2017 |
| WO | 2019096389 | A1 | 5/2019 |

OTHER PUBLICATIONS

Farooq, Hasan; "A Paradigm Shifting Approach in SON for Future Cellular Networks"; A Dissertation Submitted to the Graduate Faculty; University of Oklahoma Graduate College; 2018; 198 pages.

3GPP TR 36.814 V9.2.0; 3rd Generation Partnership Project; Technical Specification Group Radio Access Network; Evolved Universal Terrestrial Radio Access (E-UTRA); Further Advancements for E-UTRA Physical Layer Aspects (Release 9); Mar. 2017; 105 pages.

3GPP TR 36.805 V1.2.1; 3rd Generation Partnership Project; Technical Specification Group Radio Access Network; Study on Minimization of drive-tests in Next Generation Networks; (Release 9); Oct. 2009; 20 pages.

3GPP TR 36.902 V9.2.0; 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); Jun. 2010; 21 pages.

Abu-Ghazaleh, Haitham, et al.; "Application of Mobility Prediction in Wireless Networks Using Markov Renewal Theory"; IEEE Transactions on Vehicular Technology; vol. 59, No. 2; Feb. 2010; 15 pages.

Amirrudin, Nurul 'Ain, et al.; "User's Mobility History-based Mobility Prediction in LTE Femtocells Network"; 2013 IEEE International RF and Microwave Conference (RFM2013), Dec. 9-11, 2013; Penang, Malaysia; 6 pages.

Andrews, Jeffrey G., et al.; "An Overview of Load Balancing in HetNets: Old Myths and Open Problems"; IEEE Wireless Communications; Jul. 2013; 18 pages.

Araujo, Ivanes Lian Costa, et al.; "Traffic-Aware Sleep Mode Algorithm for 5G Networks"; 2015 International Workshop on Telecommunications (IWT); 2015; 5 pages.

Asghar, Ahmad, et al.; "A Novel Load-Aware Cell Association for Simultaneous Network Capacity and User QoS Optimization in Emerging HetNets"; 2017 IEEE 28th Annual International Symposium on Personal, Indoor, and Mobile Radio Communications (PIMRC); 2017; 7 pages.

Ashraf, Imran, et al.; "SLEEP Mode Techniques for Small Cell Deployments"; IEEE Communications Magazine; Aug. 2011; 9 pages.

Auer, Gunther, et al.; "How Much Energy is Needed to Run a Wireless Network?"; IEEE Wireless Communications; Jul. 2012; 11 pages.

Badic, B., et al.; "Energy Efficient Radio Access Architectures for Green Radio: Large versus Small Cell Size Deployment"; 2009 IEEE 70th Vehicular Technology Conference; 2009; 5 pages.

Barbu, Vlad, et al.; "Nonparametric Estimation for Failure Rate Functions of Discrete Time semi-Markov Processes"; Probability, Statistics and Modelling in Public Health; Springer, 2006; 20 pages.

Buzzi, Stefano, et al.; "A Survey of Energy-Efficient Techniques for 5G Networks and Challenges Ahead"; IEEE J. Sel. Areas Commun.; vol. 34, No. 4; 2016; 14 pages.

Cao, Fengming, et al.; "The Tradeoff Between Energy Efficiency and System Performance of Femtocell Deployment"; 7th International Symposium on Wireless Communication Systems; 2010; 5 pages.

Choi, Jeongsik, et al.; "Throughput Estimation Based Distributed Base Station Selection in Heterogeneous Networks"; IEEE Transactions on Wireless Communications; vol. 14, No. 11; Nov. 2015; 13 pages.

Corradi, Gianfranco, et al.; "Numerical Treatment of Homogeneous Semi-Markov Processes in Transient Case—A Straightforward Approach"; Methodology and Computing in Applied Probability; Jun. 2004; 15 pages.

Ebrahim, Aysha, et al.; "Interference and Resource Management Through Sleep Mode Selection in Heterogeneous Networks"; IEEE Transactions on Communications; vol. 65, No. 1; Nov. 2016; 14 pages.

Elayoubi, Salah Eddine, et al.; "A Hybrid Decision Approach for the Association Problem in Heterogeneous Networks"; 2010 Proceedings IEEE INFOCOM; 2010; 6 pages.

Farooq, Hasan, et al.; "Spatiotemporal Mobility Prediction in Proactive Self-Organizing Cellular Networks"; IEEE Communications Letters; vol. 21, No. 2; Feb. 2017; 4 pages.

Fehske, Albrecht J., et al.; "Concurrent Load-Aware Adjustment of User Association and Antenna Tilts in Self-Organizing Radio Networks"; IEEE Transactions on Vehicular Technology; vol. 62, No. 5; Jun. 2013; 16 pages.

Fehske, Albrecht, et al.; "Small Cell Self-Organizing Wireless Networks"; Proceedings of the IEEE; Mar. 2014; 14 pages.

Gambs, Sebastien, et al.; "Next Place Prediction using Mobility Markov Chains"; Proceedings of the First Workshop on Measurement, Privacy, and Mobility; 2012; 7 pages.

Ghosh, Joy, et al.; "Sociological Orbit Aware Location Approximation and Routing (SOLAR) in DTN"; https://cse.buffalo.edu/tech-reports/2005-12.pdf; 2005; 8 pages.

Gorawski, Michal, et al.; "Review of Mobility Models for Performance Evaluation of Wireless Networks"; Man-Machine Interactions 3; Springer International Publishing; 2014; 12 pages.

Huawei Technologies, Co., Ltd.; "Five Trends to Small Cell 2020"; MWC 2016; Feb. 22-25, 2016; Barcelona; 16 pages.

Imran, Ali, et al.; "Challenges in 5G: How to Empower SON with Big Data for Enabling 5G"; IEEE Network; Nov./Dec. 2014; 9 pages.

Kaddour, Fatima Zohra, et al.; "Green Opportunistic and Efficient Resource Block Allocation Algorithm for LTE Uplink Networks"; IEEE Transactions on Vehicular Technology; vol. 64, No. 10; Oct. 2015; 14 pages.

Katsaros, Dimitrios, et al.; "Prediction in Wireless Networks by Markov Chains"; IEEE Wireless Communications; May 2009; 12 pages.

Kreuger, Per, et al.; "Autonomous Load Balancing of Heterogeneous Networks"; IEEE Vehicular Technology Conference; Jul. 2015; 6 pages.

Lateef, Hafiz Yasar, et al.; "A Framework for Classification of Self-Organising Network Conflicts and Coordination Algorithms"; 2013 IEEE 24th International Symposium on Personal, Indoor and Mobile Radio Communications: Mobile and Wireless Networks; 2013; 6 pages.

Lateef, Hafiz Yasar, et al.; "LTE-Advanced Self-Organizing Network Conflicts and Coordination Algorithms"; IEEE Wireless Communications; Jun. 2015; 10 pages.

(56) References Cited

OTHER PUBLICATIONS

Lee, Jong-Kwon, et al.; "Modeling Steady-state and Transient Behaviors of User Mobility: Formulation, Analysis, and Application"; MobiHoc'06; Florence, Italy; May 22-25, 2006; 12 pages.
Lee, Kyunghan, et al.; "SLAW: A Mobility Model for Human Walks"; Proceedings IEEE Infocom; May 2009; 10 pages.
Li, Zhehan, et al.; "Traffic-Aware Cell Management for Green Ultra-dense Small Cell Networks"; IEEE Trans. Veh. Technol.; vol. 66, No. 3; Jun. 2016; 15 pages.
Lin, Yi-Bing, et al.; "Predicting Human Movement Based on Telecom's Handoff in Mobile Networks"; IEEE Transactions on Mobile Computing; vol. 12, No. 6; Jun. 2013; 6 pages.
Litjens, Remco, et al.; "Potential of Energy-Oriented Network Optimisation: Switching Off Over-Capacity in Off-Peak Hours"; 21st Annual IEEE International Symposium on Personal, Indoor and Mobile Radio Communications; 2010; 5 pages.
Liu, Yang, et al.; "QoS-aware Distributed Cell Sleep Algorithm for OFDMA Small Cell Networks"; 2015 IEEE 82nd Vehicular Technology Conference; 2015; 5 pages.
Lobinger, Andreas, et al.; "Load Balancing in Downlink LTE Self-Optimizing Networks"; 2010 IEEE 71st Vehicular Technology Conference; 2010; 6 pages.
Lv, Qiujian, et al.; "Big Data Driven Hidden Markov Model Based Individual Mobility Prediction at Points of Interest"; IEEE Transactions on Vehicular Technology; vol. 66, No. 6; Jun. 2017; 10 pages.
Marsan, Marco Ajmone, et al.; "Optimal Energy Savings in Cellular Access Networks"; 2009 IEEE International Conference on Communications Workshops; 2009; 6 pages.
Munoz, Pablo, et al.; "Fuzzy Rule-Based Reinforcement Learning for Load Balancing Techniques in Enterprise LTE Femtocells"; IEEE Transactions on Vehicular Technology; vol. 62, No. 5; Jun. 2013; 13 pages.
Munoz, P., et al.; "Optimization of Load Balancing using Fuzzy Q-Learning for Next Generation Wireless Networks"; Expert Systems with Applications; vol. 40; 2013; 11 pages.
Nadembega, Apollinaire, et al.; "A Destination & Mobility Path Prediction Scheme for Mobile Networks"; IEEE Transactions on Vehicular Technology; Jan. 2014; 15 pages.
Nathaniel, Salawu, et al.; "Multi-Criteria Load Balancing Decision Algorithm for LTE Network"; 014 4th International Conference on Engineering Technology and Technopreneuship (ICE2T); 2014; 7 pages.
Navaratnarajah, Shobanraj, et al.; "Energy Efficiency in Heterogeneous Wireless Access Networks"; IEEE Wireless Communications; Oct. 2013; 8 pages.
Niu, Zhisheng; "TANGO: Traffic-Aware Network Planning and Green Operation"; IEEE Wireless Communications; Oct. 2011; 5 pages.
Oh, Eunsung, et al.; "Dynamic Base Station Switching-on/off Strategies for Green Cellular Networks"; IEEE Trans. Wirel. Commun.; vol. 12, No. 5; May 2013; 11 pages.
Partov, Bahar, et al.; "Energy-Aware Configuration of Small Cell Networks"; 2014 IEEE 25th International Symposium on Personal, Indoor and Mobile Radio Communications; 2014; 6 pages.
Powerwave; "Dual Broadband Antennas"; P45-17-XLH-RR; http://raycom-w.ru/files/import_pdf/P45-17-XLH-RR.ru.pdf; Mar. 19, 2012; 1 page.
Qu, Yexiao, et al.; "Equilibrated Activating Strategy with Small Cell for Energy Saving in Heterogeneous Network"; 2014 IEEE 80th Vehicular Technology Conference (VTC2014—Fall); 2014; 6 pages.
Samarakoon, Sumudu, et al.; "Opportunistic Sleep Mode Strategies in Wireless Small Cell Networks"; 2016 IEEE International Conference on Communications (ICC); 2016; 7 pages.
Schumm, Irene; "Lessons Learned From Germany's 2001-2006 Labor Market Reforms"; Julius-Maximilians—University of Würzburg; Apr. 30, 2009; 171 pages.
Sheng, Min, et al.; "Zone-Based Load Balancing in LTE Self-Optimizing Networks: A Game-Theoretic Approach"; IEEE Transactions on Vehicular Technology; vol. 63, No. 6; Jul. 2014; 10 pages.
Singh, Sarabjot, et al.; "Offloading in Heterogeneous Networks: Modeling, Analysis, and Design Insights"; IEEE Trans. Wirel. Commun.; vol. 12, No. 5; May 2013; 15 pages.
Sobol, I.M.; "Global Sensitivity Indices for Nonlinear Mathematical Models and their Monte Carlo Estimates"; Mathematics and Computers in Simulation; vol. 55; 2001; 10 pages.
Song, Chaoming, et al.; "Limits of Predictability in Human Mobility"; Science; Feb. 19, 2010; 6 pages.
Sun, Yang, et al.; "An Energy-efficiency Aware Sleeping Strategy for Dense Multi-tier HetNets"; 2014 IEEE Globecom Workshops (GC Wkshps); 2014; 6 pages.
Tao, Ran, et al.; "An Energy Saving Small Cell Sleeping Mechanism With Cell Expansion in Heterogeneous Networks"; 2016 IEEE 83rd Vehicular Technology Conference (VTC Spring); 2016; 5 pages.
Tung, Li-Ping, et al.; "An Interference-aware Small Cell on/off Mechanism in Hyper Dense Small Cell Networks"; 2017 Workshop on Computing, Networking and Communications (CNC); 2017; 5 pages.
Viering, Ingo, et al.; "A Mathematical Perspective of Self-Optimizing Wireless Networks"; 2009 IEEE International Conference on Communications; 2009; 6 pages.
Wang, Qi, et al.; "A Distributed Base Station On/Off Control Mechanism for Energy Efficiency of Small Cell Networks": IEEE ICC 2015—Mobile and Wireless Networking Symposium; 2015; 6 pages.
Li, Zhihang, et al.; "Heterogenous QoS-guaranteed load balancing in 3GPP LTE multicell fractional frequency reuse network"; Transactions on Emerging Telecommunications Technologies; vol. 25; 2014; 15 pages.
Wu, Shie, et al.; "Load-Aware Energy Efficiency Optimization in Dense Small Cell Networks"; IEEE Communications Letters; vol. 21, No. 2; Feb. 2017; 4 pages.
Xuan, Jifeng, et al.; "Pseudo Code of Genetic Algorithm and Multi-Start Strategy Based Simulated Annealing Algorithm for Large Scale Next Release Problem"; Dalian University of Technology; 2011; 3 pages.
Ye, Qiaoyang, et al.; "User Association for Load Balancing in Heterogeneous Cellular Networks"; IEEE Trans. Wirel. Commun.; vol. 12, No. 6; Jun. 2013; 25 pages.
Yuan, Quan, et al.; "An Efficient Prediction-Based Routing in Disruption-Tolerant Networks"; IEEE Transactions on Parallel and Distributed Systems; vol. 23, No. 1; Jan. 2012; 13 pages.
Zhang, Shan, et al.; "Energy-Aware Traffic Offloading for Green Heterogeneous Networks"; IEEE J. Sel. Areas Commun.; vol. 34, No. 5; May 2016; 31 pages.
Zhang, Daqiang, et al.; "Mobility Prediction in Telecom Cloud Using Mobile Calls"; IEEE Wireless Communications; Feb. 2014; 7 pages.
Zhang, Daqiang, et al.; "NextCell: Predicting Location Using Social Interplay from Cell Phone Traces"; IEEE Transactions on Computers; vol. 64, No. 2; Feb. 2015; 12 pages.
Zhou, Fanqin, et al.; "A Load Balancing Method in Downlink LTE Network based on Load Vector Minimization"; FIP/IEEE International Symposium on Integrated Network Management (IM); 2015; 7 pages.
Zhou, Xuan, et al.; "Human Mobility Patterns in Cellular Networks"; IEEE Communications Letters; vol. 17, No. 10; Oct. 2013; 5 pages.
Farooq, Hasan, et al.; "Mobility Prediction-Based Autonomous Proactive Energy Saving (AURORA) Framework for Emerging Ultra-Dense Networks"; IEEE Transactions on Green Communications and Networking; vol. 2, No. 4; Dec. 2018; 14 pages.
European Extended Search Report; Application No. 20840318.8; May 22, 2023; 13 pages.

* cited by examiner

100
AURORA
MACRO CELL
SMALL CELL
TRAINING DATA
CDRs
HO REPORTS
UE MEASUREMENTS
CIO
ON/OFF STATE
CELL RANGE EXPANSION THROUGH CIO
SLEEPING SMALL CELL
PROACTIVE ENERGY SAVING OPTIMIZATION
LB
P-ESO
CCO
MOBILITY PREDICTION
SEMI-MARKOV BASED MOBILITY PREDICTION
NEXT CELL HO
TIME OF HO
FUTURE LOCATION ESTIMATION

110

MINIMALISTIC
TRAINING DATA
• CDRs
• HO REPORTS
• UE MEASUREMENTS
OFF SMALL CELL
SMALL CELL RANGE
EXPANSION
THROUGH CIO
ON
SMALL
CELL
MACRO
CELL
MACRO CELL
SECTOR BOUNDARY
REAL
NETWORK
MACRO CELL COVERAGE
MODIFICATIONS WITH ANTENNA
TILTS, AZIMUTHS, BEAM WIDTHS,
DL TRANSMIT POWERS, ETC
SMALL CELL
COVERAGE
TO FIG. 1B-2

400

500

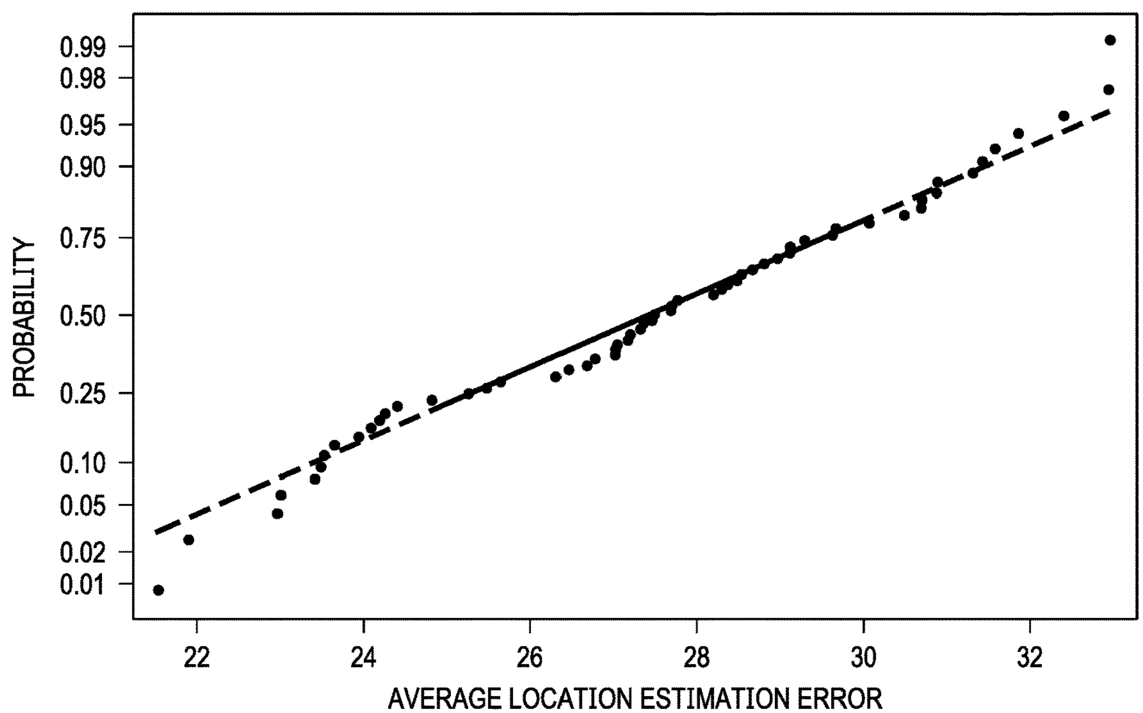
600
FIG. 6
NORMAL PROBABILITY PLOT
PROBABILITY
0.99
0.98
0.95
0.90
0.75
0.50
0.25
0.10
0.05
0.02
0.01
22
24
26
28
30
32
AVERAGE LOCATION ESTIMATION ERROR

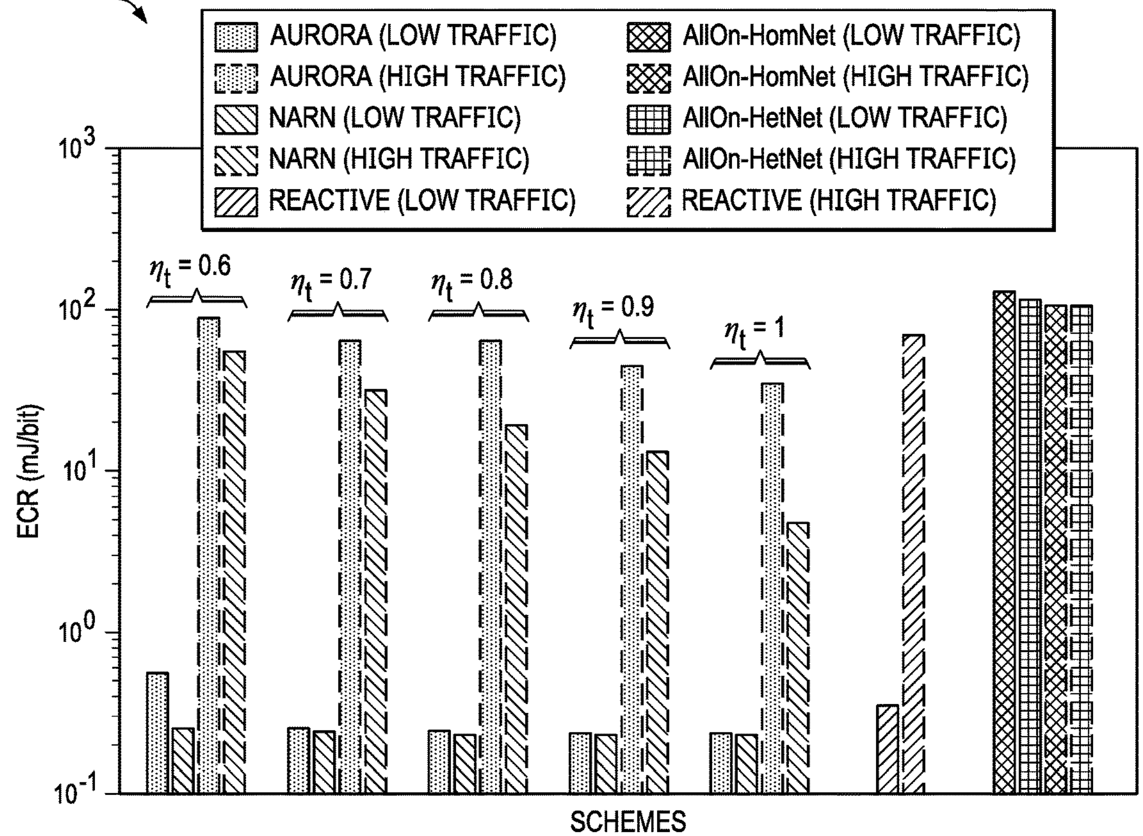
700
FIG. 7
ENERGY CONSUMPTION RATIO (ECR)
AURORA (LOW TRAFFIC)
AURORA (HIGH TRAFFIC)
NARN (LOW TRAFFIC)
NARN (HIGH TRAFFIC)
REACTIVE (LOW TRAFFIC)
AllOn-HomNet (LOW TRAFFIC)
AllOn-HomNet (HIGH TRAFFIC)
AllOn-HetNet (LOW TRAFFIC)
AllOn-HetNet (HIGH TRAFFIC)
REACTIVE (HIGH TRAFFIC)
$\eta_t$ = 0.6
$\eta_t$ = 0.7
$\eta_t$ = 0.8
$\eta_t$ = 0.9
$\eta_t$ = 1
ECR (mJ/bit)
$10^3$
$10^2$
$10^1$
$10^0$
$10^{-1}$
SCHEMES

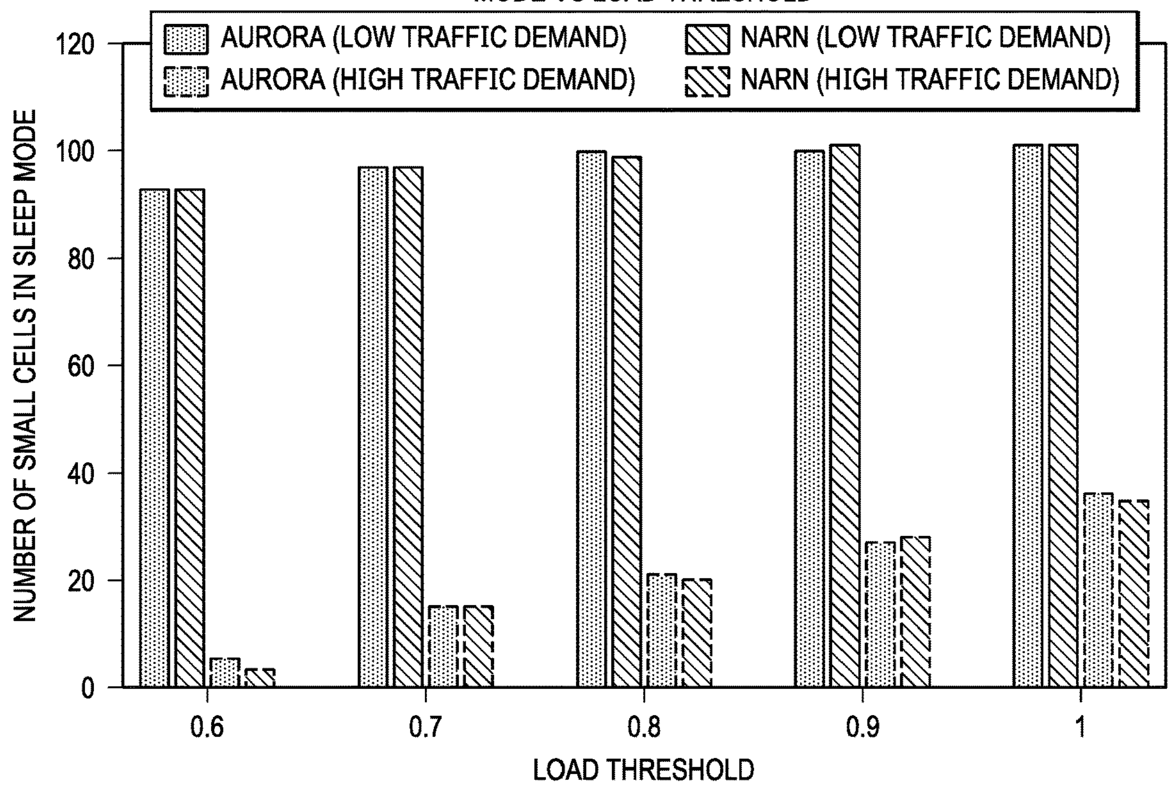
900
NUMBER OF SMALL CELLS IN SLEEP MODE VS LOAD THRESHOLD
FIG. 9
AURORA (LOW TRAFFIC DEMAND)
NARN (LOW TRAFFIC DEMAND)
AURORA (HIGH TRAFFIC DEMAND)
NARN (HIGH TRAFFIC DEMAND)
NUMBER OF SMALL CELLS IN SLEEP MODE
120
100
80
60
40
20
0
0.6
0.7
0.8
0.9
1
LOAD THRESHOLD

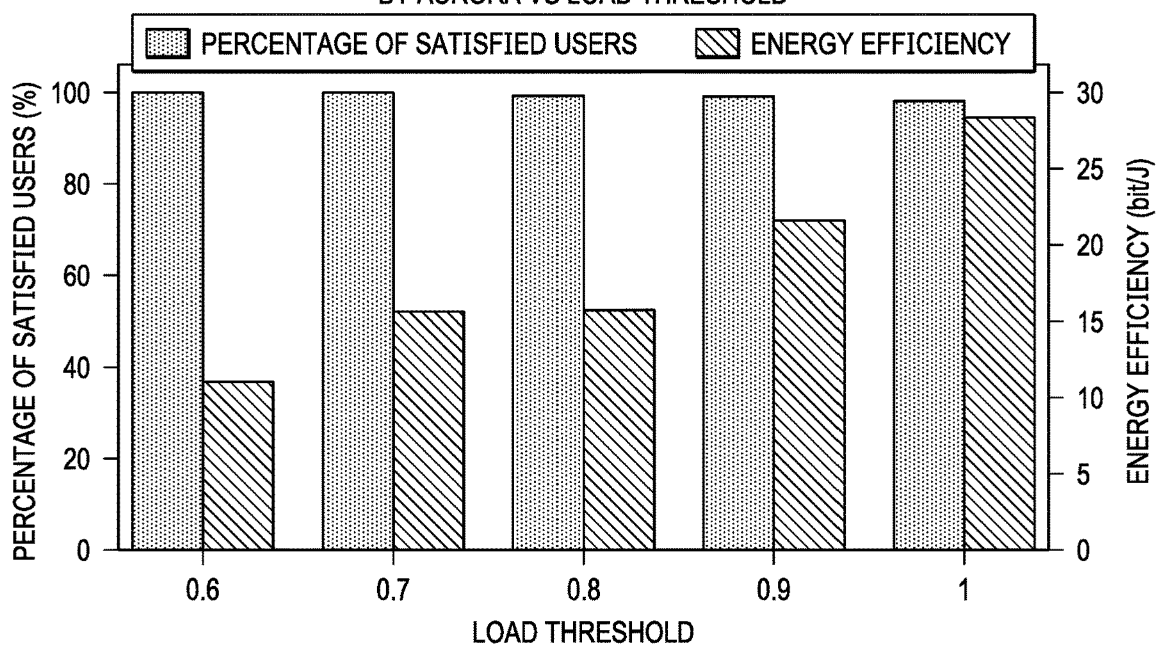
1100
PERCENTAGE OF SATISFIED USERS BY AURORA VS LOAD THRESHOLD
FIG. 11
PERCENTAGE OF SATISFIED USERS
ENERGY EFFICIENCY
PERCENTAGE OF SATISFIED USERS (%)
100
80
60
40
20
0
ENERGY EFFICIENCY (bit/J)
30
25
20
15
10
5
0
0.6
0.7
0.8
0.9
1
LOAD THRESHOLD SMALL CELLS ON/OFF STATES WITH AURORA (LOW TRAFFIC DEMAND)
1000
800
600
400
200
0
-200
-400
-600
-800

1200
CELL LOADS OF ON CELLS
CELL LOADS
1.2
1.0
0.8
0.6
0.4
0.2
0
AVERAGE CIO = 4.4 dB
AVERAGE CIO = 4 dB
AVERAGE CIO = 5 dB
AVERAGE CIO = 4.5 dB
CIO = 0 dB
CIO = 10 dB
AURORA: $\eta_t = 0.6$
NARN: $\eta_t = 0.6$
AURORA: $\eta_t = 1$
NARN: $\eta_t = 1$
AllOn-HomNet
AllOn-HetNet 1300
AVERAGE UE SINR (dB) CDF
CDF
SINR (dB)
0
0.2
0.4
0.6
0.8
1
5
10
15
20
25
30
AURORA: $\eta_t$ = 0.6 (ECR = 90.56 mJ/bit)
NARN: $\eta_t$ = 0.6 (ECR = 55.95 mJ/bit)
AURORA: $\eta_t$ = 1 (ECR = 35.38 mJ/bit)
NARN: $\eta_t$ = 1 (ECR = 4.80 mJ/bit)
AllOn-HomNet (ECR = 109 mJ/bit)
AllOn-HetNet (ECR = 107 mJ/bit)

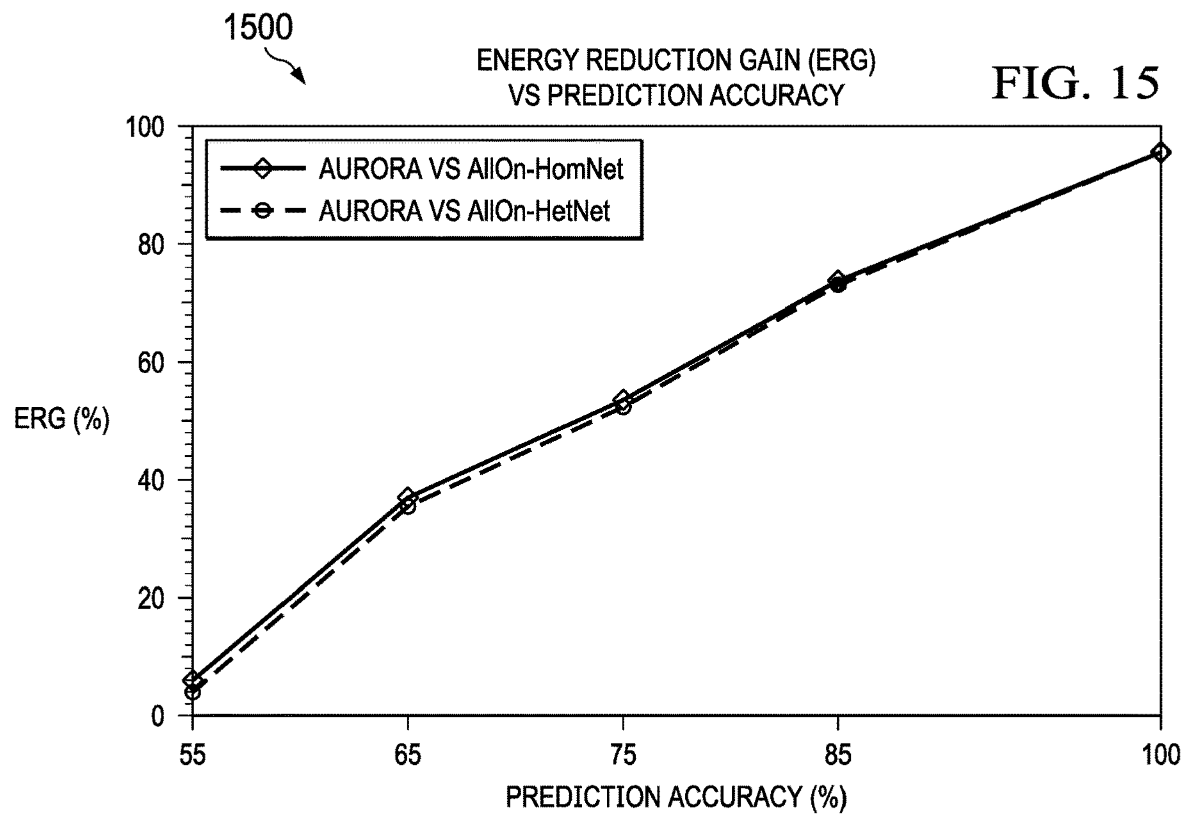
FIG. 15
FIG. 16
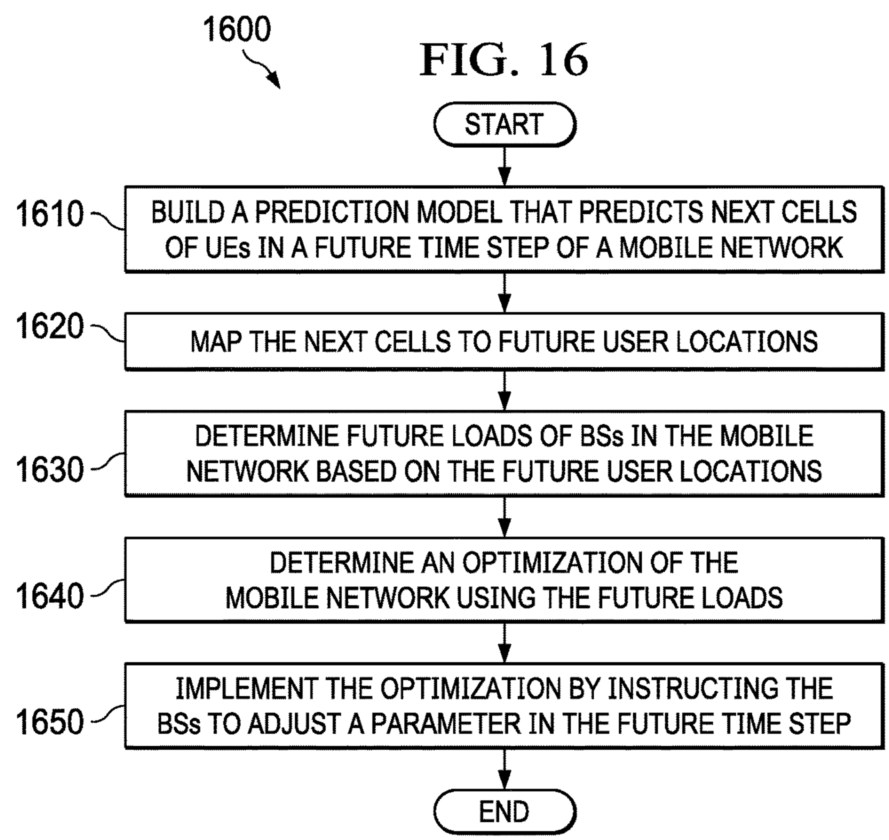

PROACTIVE MOBILE NETWORK OPTIMIZATION

CROSS-REFERENCE TO RELATED APPLICATIONS

This is a national stage of Int'l Patent App. No. PCT/US2020/037205 filed on Jun. 11, 2020, which claims priority to U.S. Prov. Patent App. No. 62/875,841 filed on Jul. 18, 2019, both of which are incorporated by reference.

STATEMENT REGARDING FEDERALLY SPONSORED RESEARCH OR DEVELOPMENT

This invention was made with government support under grant numbers 1619346, 1559483, 1718956, and 1730650 awarded by the National Science Foundation. The government has certain rights in the invention.

BACKGROUND

The current exponential mobile data traffic escalation is a precursor towards an imminent capacity crunch. In this backdrop, extreme network densification through deployment of a large number of small cells has emerged as the most yielding solution to achieve the 1,000-fold capacity gain goal. However, the ultra-dense deployments of small cells is on a direct collision path with the economically viable and energy efficient deployment vision of 5G. This is due to the high aggregated network energy that "always-on" small cells are bound to consume in a UDN. In addition to a higher carbon footprint, this translates into higher operating expenses. Although small cells have a relatively lower power consumption profile, the always ON approach increases overall network-wide energy consumption. This is because the load-independent power consumption (circuit power) components in small cells constitute a much larger portion of overall power consumption. As a result, with the advent of UDNs, the need for energy saving schemes will be even more compelling. It is a consensus in the research community that to avert an energy crunch in 5G and to achieve economic viability, the 1,000-fold capacity increase must be achieved at a similar or lower power consumption as legacy networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a state transition diagram for a semi-Markov model.

FIG. 6 is a graph of average location estimation error.

FIG. 7 is a bar chart comparing an ECR for AURORA to ECRs of other schemes.

FIG. 9 is a bar chart of an average number of small cells put to sleep with AURORA and NARN.

FIG. 11 is a bar chart of an average percentage of satisfied users under AURORA versus load threshold energy efficiency.

FIG. 15 is a graph of average ERG of AURORA for varying values of prediction accuracy.

FIG. 16 is a flowchart illustrating a method of proactive mobile network optimization according to an embodiment of the disclosure.

DETAILED DESCRIPTION

Figure 1A:
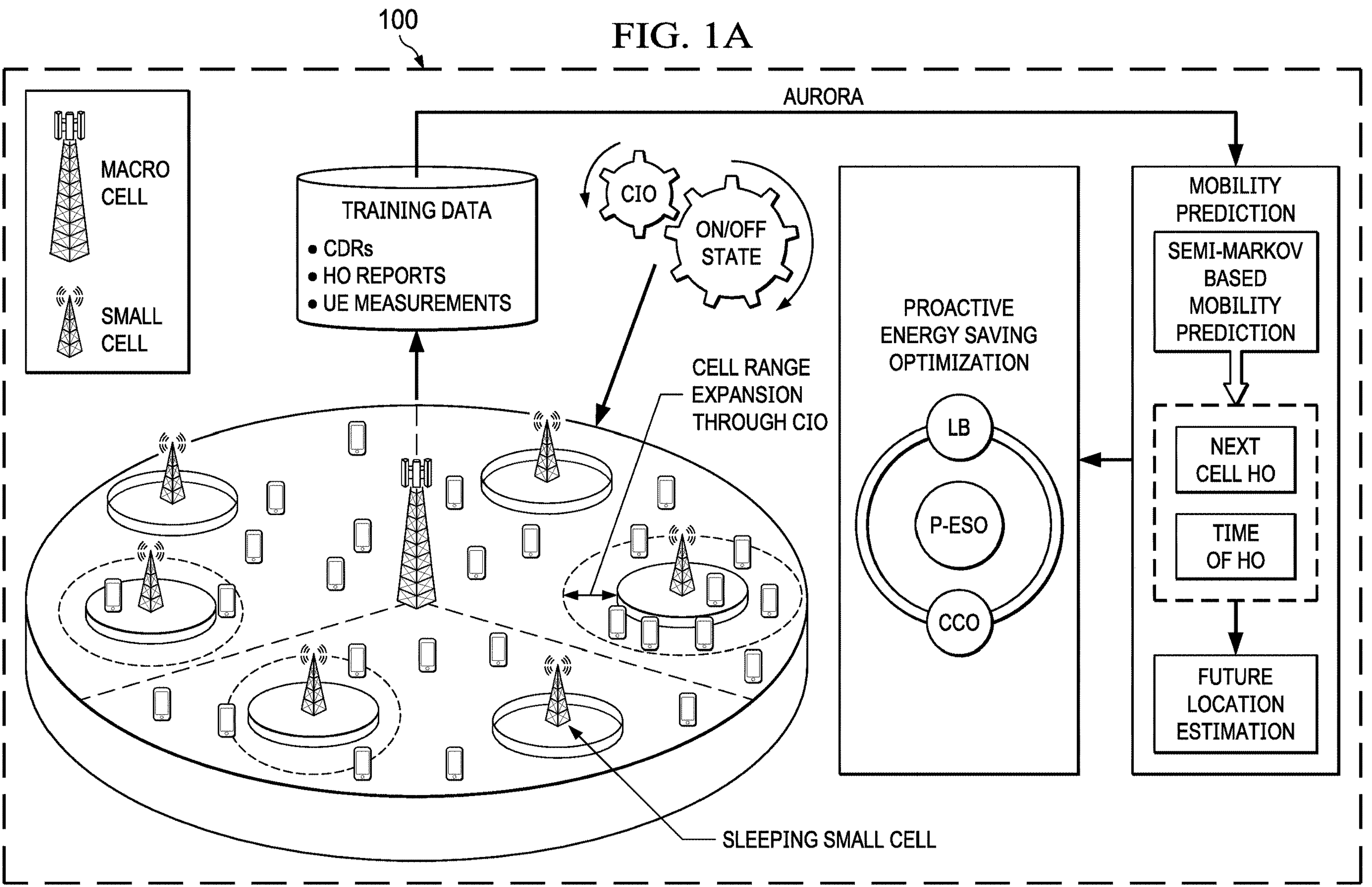
FIG. 1A is a schematic diagram of AURORA according to an embodiment of the disclosure.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The following abbreviations apply:

AllOn-HetNet: all cell on with heterogeneous network settings

AllOn-HomNet: all cell on with homogeneous network settings

ASIC: application-specific integrated circuit

AURORA: mobility-prediction-based, AUtonomous, pROactive eneRgy sAving

BS: base station

CCO: coverage and capacity optimization

CDF: cumulative distribution function

CDR: call detail record

CIO: cell individual offset

CPU: central processing unit

CQI: channel quality indicator
CS: cellular system
C-SON: centralized SON
CTMC: Continuous-Time Markov Chain
dB: decibel(s)
dBm: decibel-milliwatt(s)
DSP: digital signal processor
DTMC: discrete-time Markov chain
ECR: energy consumption ratio
eICIC: enhanced inter-cell interference coordination
EO: electrical-to-optical
ERG: energy reduction gain
FPGA: field-programmable gate array
FTP: File Transfer Protocol
GPS: Global Positioning System
HetNet: heterogeneous network
HomNet: homogeneous network
ID: identifier
kbps: kilobit(s) per second
KPI: key performance indicator
LB: load balancing
LTE: Long-Term Evolution
MC: macro cell
MIMO: multiple-input, multiple-output
MINLP: mixed-integer, non-linear programming
mJ/bit: millijoule(s) per bit
MRO: mobility robustness optimization
NARN: near-optimal performance bound
NP: non-deterministic polynomial-time
OE: optical-to-electrical
OPC: optimal parameter configuration
P-ESO: proactive energy saving optimization
PRB: physical resource block
QCI: QoS class identifier
QoS: quality of service
RAM: random-access memory
RAT: radio access technology
RF: radio frequency
ROM: read-only memory
RSRP: reference signal received power
RSRQ: reference signal received quality
RSS: received signal strength
RX: receiver unit
SINR: signal-to-interference-plus-noise ratio
SLAW: self-similar least action walk
SON: self-organizing network
SRAM: static RAM
TCAM: ternary content-addressable memory
TTI: transmission time interval
TX: transmitter unit
UDN: ultra-dense network
UE: user equipment
UIO: user individual offset
3GPP: 3rd Generation Partnership Project
5G: fifth generation.

Energy consumption in CSs can be reduced significantly by turning off underutilized cells during off-peak hours or by optimizing resource allocation such that a minimum energy is consumed per bit transmission. To exploit these approaches, recently energy saving has been adopted as a key SON function by 3GPP and has been extensively studied in literature. Energy saving enhancement with a focus on optimizing resource allocation despite of its relatively small gain compared to turning off under-utilized BSs has been studied more extensively compared to the latter approach. Resource allocation optimization can reduce energy consumption to a limited degree for a given system throughput target. Energy saving of cellular systems can be further enhanced by switching under-utilized BSs to a sleep mode or turning them off entirely during off-peak time. In this direction of research, some recent works show promising results in terms of potential energy saving. However, existing energy saving approaches fall short of the mark for 5G requirements due to the following four limitations.

First, currently there is a reactive mode of operation. Current energy saving SON algorithms are designed to switch off/on cells after detecting network conditions that have already taken effect. For example, when congestion is detected in a network, usually a non-convex NP-hard energy saving algorithm is solved to identify certain sleeping/off cells, that should be switched on. Using the same process, certain cells are switched off when a low load is observed in certain cells. This is an improvement over fixed-timer-based switching on/off that can at best follow a coarse statistical spatio-temporal traffic pattern and thus achieves energy saving at a cost of QoS. However, given the acute dynamics of the traffic and cellular environment, by the time congestion or low traffic conditions are detected and a realistic non-convex NP-hard energy saving algorithm is solved to produce a new network on/off configuration optimal for observed network conditions, the conditions may already change. Thus, the newly determined switch on/off vector is likely to be suboptimal before it can be actuated. This is a particular problem in 5G, where a diversity of traffic and a plethora of cell types means the dynamics of the cellular ecosystem will be even more swift.

Second, a difficulty in meeting the 5G low-latency requirement is that BSs requires a certain amount of time to wake up from a sleep cycle. For a user entering a sleeping cell, this time to wake up will add to the latency experienced by the user. This demands a paradigm shift from the current reactive design of energy saving algorithms towards proactive characteristics to cope with the low-latency requirements of 5G in a more agile fashion.

Third, currently there is an impractical cell discovery. A key challenge in switching off-based energy saving schemes is how to discover an off cell when users enter into a physical coverage area of the off cell. Existing energy saving schemes either overlook this challenge or propose solutions that either exploit neighboring cells or a master controller to wake up the cell when enough users enter into the coverage area of off cell. This approach may work in low-user-density networks with large macro cells with relatively less stringent QoS requirements such as LTE, but it may not scale to 5G because of signaling overhead, delays, and a cost of missing off small cells for off-loading.

Fourth, SONs have a conflict-prone design. Current energy saving solutions are oblivious to the fact that multiple SON functions may be prone to hidden or undesired conflict when implemented together in a network. Two SON use cases that are relevant to the energy saving in HetNets are CCO and LB because of the overlap among their optimization parameter set. That overlap includes transmission power and CIOs. When an energy saving switches off some cells, it may force some users to be associated to neighboring on cells and overload them, thereby conflicting with CCO and LB SON functions. Such designs can degrade network performance instead of improving it.

Disclosed herein are embodiments for proactive mobile network optimization. A framework referred to as AURORA implements the embodiments to address the limitations above. The embodiments make emerging cellular systems artificially intelligent and autonomous so that they can anticipate user mobility behavior. This intelligence, in turn, is then used to formulate a novel energy saving optimization problem that proactively schedules small cell sleep cycles to divert and focus the right amount of resources when and where needed while satisfying QoS requirements. First, a spatio-temporal mobility prediction framework is a building block of AURORA. The model overcomes the limitations of conventional discrete time Markov chain based prediction models that fail to incorporate the time dimension, for instance time of the next handover. Next, a method maps the next cell spatio-temporal handover information to the estimated future location coordinates based on landmarks. The method further increases the spatial resolution of the future location estimation without requiring an increase in the number of states for the semi-Markov model. The accuracy of the model is quantified through extensive Monte Carlo simulations. Second, based on the knowledge of future cell loads gained from the mobility model, a proactive energy saving optimization problem is formulated to minimize the energy consumption by switching off underutilized small cells. In addition to proactiveness, the energy saving scheme leverages CIOs as optimization variables for balancing load among cells while deciding which cells to switch on/off. In this way, an additional UDN-specific mechanism is exploited to ensure QoS while maximizing energy saving. Although the formulated problem is non-convex large scale combinatorial and NP-hard, the results show that the structure of the problems allows heuristics such as genetic programming to find good solutions with a high energy saving yield. The ahead-of-time estimation of cell loads allows ample time for such heuristics to converge without jeopardizing QoS. Third, multi-tier, system-level, 3GPP-compliant simulations provide performance analyses of AURORA. The prediction accuracy of the semi-Markov based mobility prediction model has been quantified using realistic SLAW mobility model in a HetNets environment. The average location estimation error is about 28 meters, while relying only on one piece of information that is already available in the network, specifically the handover trace. Fourth, the impact of cell load thresholds on energy saving gains and QoS is analyzed for proactive energy saving optimization. The results of the analysis provide actionable insights for determining cell load thresholds that can judiciously strike the intended balance among the conflicting goals of energy saving and QoS. Fifth, a comparative analysis of the proposed solution, in low and high traffic demand scenarios with the latter comprising all video users, is performed against several benchmarks, including industrial practices. AURORA achieves 68% and 99% gain in the total network energy reduction for low and high traffic demand scenarios, respectively, by putting under-utilized small cells in sleep mode with a negligible number of unsatisfied users. Moreover, AURORA is compared with a near-optimal performance bound that is achievable when future network load conditions can be estimated with 100% accuracy. This comparison demonstrates that AURORA is reasonably resilient to location estimation inaccuracies.

Figures 1, 1B:
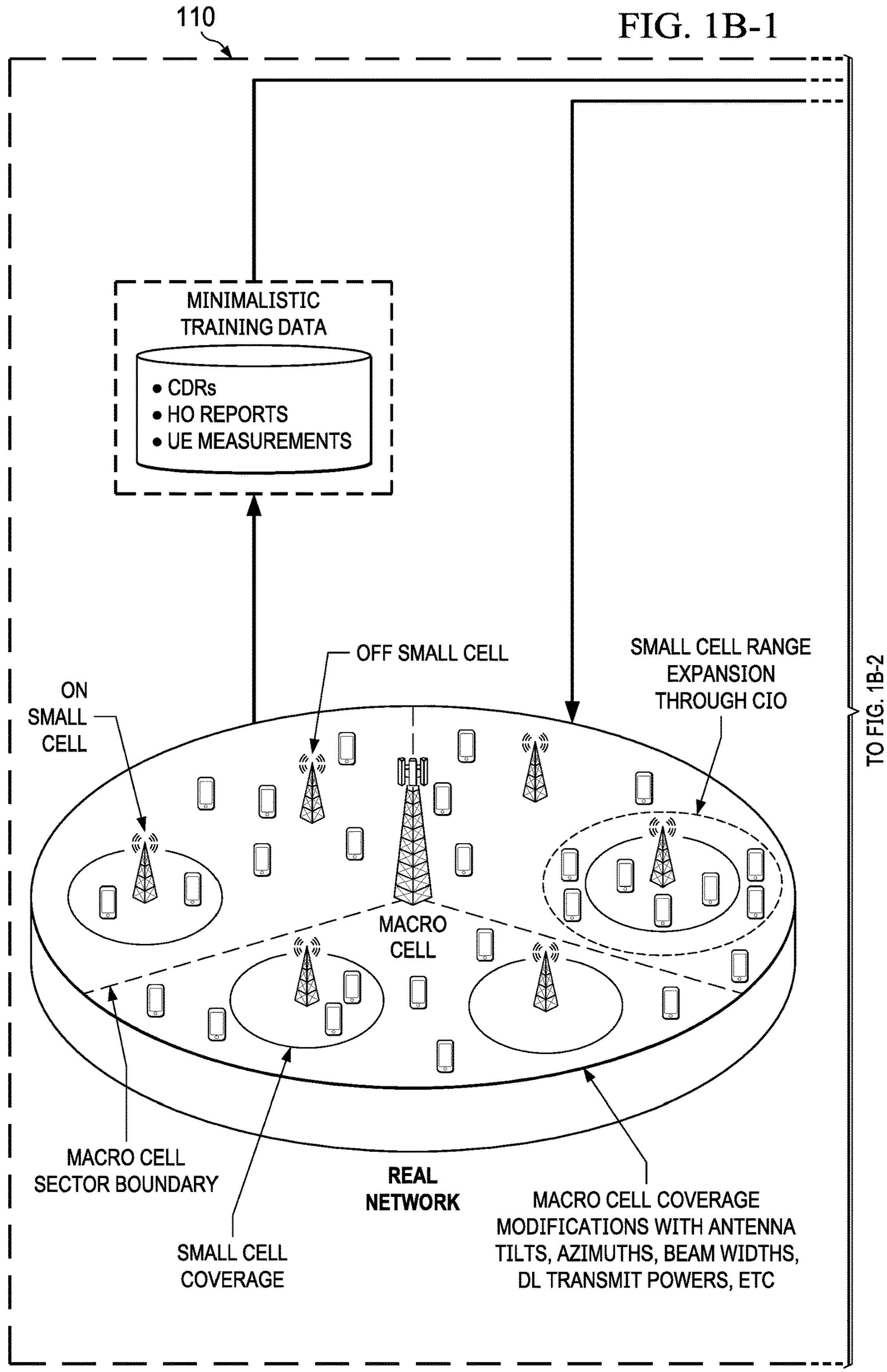
FIGS. 1B-1 and 1B-2 are a schematic diagram of AURORA according to another embodiment of the disclosure.
Figures 1, 1B, 2:
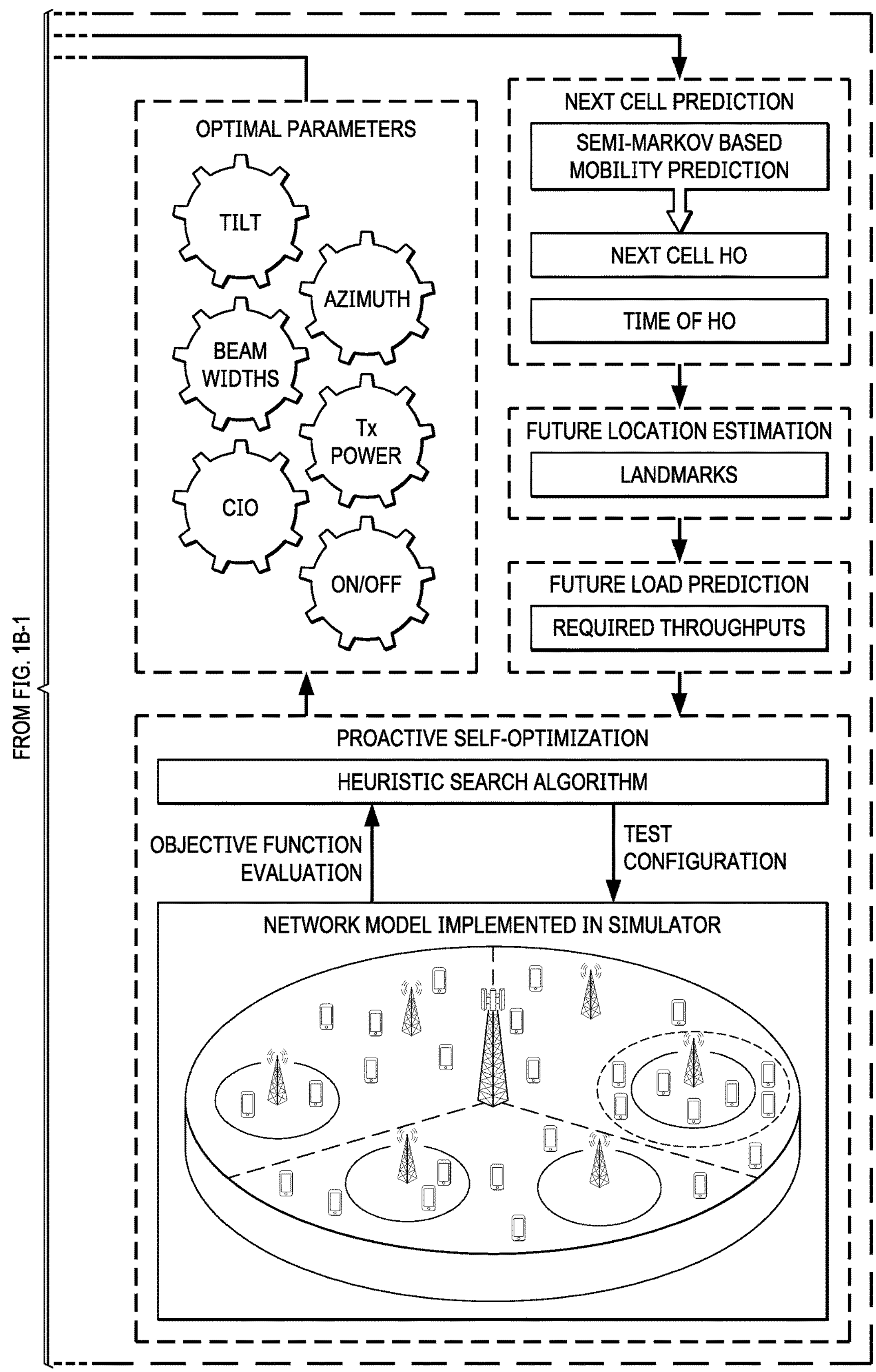
Figure 2:
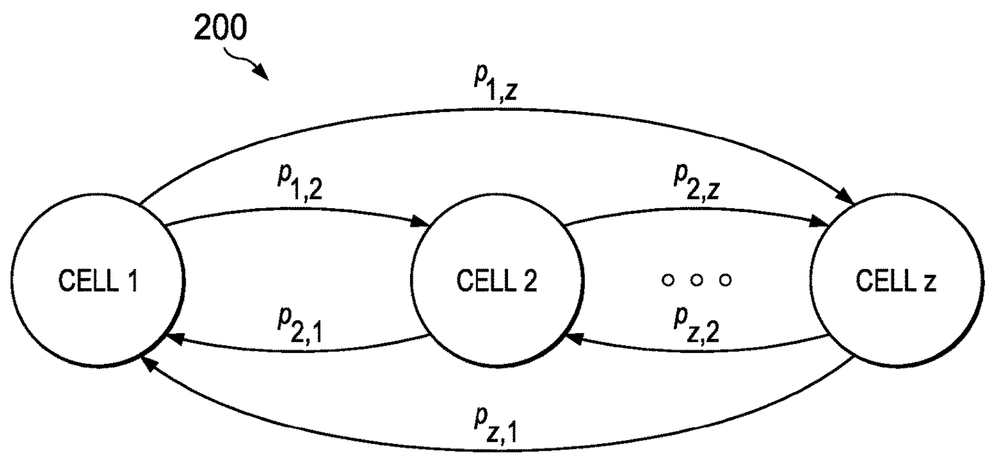

FIG. 1A is a schematic diagram 100 of AURORA according to an embodiment of the disclosure. FIGS. 1B-1 and 1B-2 are a schematic diagram 110 of AURORA according to another embodiment of the disclosure. The schematic diagram 110 may be a more detailed version of the schematic diagram 100. AURORA implements three primary functions: a semi-Markov process based spatio-temporal next cell prediction, a mapping of next cell prediction to future user location estimation, and proactive energy saving optimization based on future user location estimation.

For the sake of conciseness, the description focuses on the downlink direction. However, the embodiments apply to the uplink direction as well. It is assumed that all mobile devices and small cells have omnidirectional antennas with a constant gain in all directions, while macro cells have directional antennas. Frequency reuse of one is considered and the same band is utilized by the macrocell and the small cells. A full buffer traffic model is used for each user, so there is always data available to be sent for a user with constant bit rate service. A C-SON architecture is assumed, where a centralized server in the core network performs system-wide proactive energy saving optimization. Moreover, handover traces that include location stamped information of past cell transitions such as cell IDs, RSRPs and call detail records are assumed to be available to the C-SON server.

Semi-Markov Based Spatiotemporal Next Cell Prediction

A study analyzed real data for 10 million mobile users and showed that typical human mobility features 93% average predictability. The embodiments exploit the idea that the transition probability to a next cell can be predicted by modelling a user transition from one cell to another as a Markov stochastic process and using handover history to estimate state transition probabilities. DTMC has been commonly used in the literature for mobility prediction purposes. As compared to more complex and more space-consuming compression-based predictors, the Markov-based scheme can yield a more scalable solution as it does not need to store users' past movements. Instead, the crux of this information is captured by transition probabilities. However, DTMC is memory-less and assumes a sojourn time is geometrically distributed and each transition takes place in one unit time. Considering these limitations of the DTMC model, the aforementioned works have utilized DTMC for only the spatial prediction i.e., identification of a future cell only without any information about the time at which a handover may take place. CTMC can be utilized for mobility prediction if the human mobility is assumed to be memory-less and a cell sojourn time is assumed to be exponentially distributed. Human mobility exhibits memory properties and can be best approximated with a power law distribution instead of memory-less exponential distributions. Semi-Markov models allow for arbitrary distributed sojourn times. Some approaches characterize prediction accuracy performance of semi-Markov based models for mobility prediction. However, the disclosed embodiments use a spatio-temporal mobility prediction model, a framework to transform that prediction into future cell load estimates, and those load estimates to devise and analyze a proactive and QoS-aware energy-saving solution.

Mobility prediction model: User mobility is modeled as a semi-Markov renewal process $\{(X_n, T_n): n \geq 0\}$ with discrete state space $\mathbb{C}=\{1, 2, 3 \ldots, z\}$, where $T_n$ is the time of $n^{th}$ transition and $X_n$ is the state at $n^{th}$ transition. Each cell is represented by a state of the semi-Markov process and a handover from one cell to another is considered as a state transition. It is assumed that the process is time-homogeneous during the time period in which the model is built.

FIG. 2 is a state transition diagram 200 for a semi-Markov model. $p_{i,j}$ is the probability of transition from cell i to j. The associated time-homogeneous semi-Markov kernel for user 'u,' which is the probability of transition to a $j^{th}$ cell if the user has already spent time t in $i^{th}$ cell is defined as:

$$\psi_{i,j}^{(u)}(t) = Pr\left(X_{n+1}^{(u)} = j,\ T_{n+1}^{(u)} - T_n^{(u)} \leq t \,\middle|\, X_n^{(u)} = i\right) \quad (1)$$

-continued $$= p_{i,j}^{(u)} S_{i,j}^{(u)}(t) \tag{2}$$

where $$p_{i,j}^{(u)} = \lim_{t\to\infty} \psi_{i,j}^{(u)}(t),\ p_{i,j}^{(u)} \in P^{(u)} \tag{3}$$

$$= Pr\left(X_{n+1}^{(u)} = j \mid X_n^{(u)} = i\right) \tag{4}$$

and $$S_{i,j}^{(u)}(t) = Pr\left(T_{n+1}^{(u)} - T_n^{(u)} \le t \mid X_{n+1}^{(u)} = j,\ X_n^{(u)} = i\right) \tag{5}$$

Here $p_{i,j}^{(u)}$ is the probability of a handover of user from cell i to j, $P^{(u)}$ is the probability transition matrix of the embedded Markov chain of user given as:

$$P^{(u)} = \begin{bmatrix} p_{1,1}^{(u)} & p_{1,2}^{(u)} & \cdots & p_{1,z}^{(u)} \\ p_{2,1}^{(u)} & p_{2,2}^{(u)} & \cdots & p_{2,z}^{(u)} \\ \cdots & \cdots & \cdots & \cdots \\ p_{z,1}^{(u)} & p_{z,2}^{(u)} & \cdots & p_{z,z}^{(u)} \end{bmatrix} \tag{6}$$

and $S_{i,j}^{(u)}(t)$ is the sojourn time distribution of user 'u' in cell i when next cell is j. The probability $S_i$ that the user 'u' in cell i will leave cell 'i' before or at time 't' regardless of the next cell is defined as:

$$\Lambda_i^{(u)}(t) = Pr\left(T_{n+1}^{(u)} - T_n^{(u)} \le t \mid X_n^{(u)} = i\right) \tag{7}$$

$$= \sum_{j=1}^{z} \psi_{i,j}^{(u)}(t),\ j \ne i \tag{8}$$

Now the time-homogeneous semi-Markov process of user is defined as $X=(X_t,\ t\in \mathbb{R}_0^+)$ with state transients as:

$$\phi_{i,j}^{(u)}(t) = Pr\left(X_t^{(u)} = j \mid X_0^{(u)} = i\right) \tag{9}$$

$$= \left(1 - \Lambda_i^{(u)}(t)\right)\delta_{i,j} + \sum_{m=1}^{z} \int_0^t \phi_{m,j}^{(u)}(t-\tau)\, d\psi_{i,m}^{(u)}(\tau) \tag{10}$$

$$= \left(1 - \Lambda_i^{(u)}(t)\right)\delta_{i,j} + \sum_{m=1}^{z} \int_0^t \frac{d\psi_{i,m}^{(u)}(\tau)}{d\tau} \phi_{m,j}^{(u)}(t-\tau)\, d\tau \tag{11}$$

where $\delta_{i,j}$ is the Kronecker function defined as:

$$\delta_{i,j} = \begin{cases} 0, & \text{for } i \ne j \\ 1, & \text{for } i = j \end{cases} \tag{12}$$

Integral equations (10) and (11) are Volterra equations of the first and second kind, and the integral is the convolution of $\psi_{i,m}^{(u)}(\bullet)$ and $\phi_{m,j}^{(u)}(\bullet)$ i.e. $\psi_{i,m}^{(u)} * \phi_{m,j}^{(u)}$. It gives the probability that user 'u' starting in cell i will be in cell j by t. The first part of the right-hand side is the probability that the user, being in cell i, never leaves cell i until the end of the period t. The second part of the right-hand side of the equation accounts for all cases in which the transition from i to j occurs via another cell m≠i applying the renewal argument. First, the probability that the user stays in cell i for a period of length r and then goes to cell m is given by $\psi_{i,m}^{(u)}(\tau)$. Handover to this new cell m can be interpreted as a renewal of the process because the expected behavior of the user from then on is the same irrespective of when the user enters cell m. Therefore, the probability that the user that is in cell m at z will be in cell j at t is given by $\phi_{m,j}^{(u)}(t-\tau)$. As the transition from i to m can occur anytime between 0 and t, all possible transition times are considered by the integration over τ. To this end, the evolution equation (11) can be re-written for a discrete-time homogeneous semi-Markov process as:

$$\phi_{i,j}^{(u)}(k) = h_{i,j}^{(u)}(k) + \sum_{m=1}^{z} \sum_{\tau=1}^{k} v_{i,m}^{(u)}(\tau)\phi_{m,j}^{(u)}(k-\tau) \tag{13}$$

where $$h_{i,j}^{(u)}(k) = \left(1 - \Lambda_i^{(u)}(k)\right)\delta_{i,j} \text{ and } v_{i,m}^{(u)}(k) = \frac{d\psi_{i,m}^{(u)}(\tau)}{d\tau}$$

can be approximated as follows assuming a time step is equal to the unit:

$$v_{i,m}^{(u)}(k) = \begin{cases} \psi_{i,m}^{(u)}(1), & \text{for } k = 1 \\ \psi_{i,m}^{(u)}(k) - \psi_{i,m}^{(u)}(k-1), & \text{for } k > 1 \end{cases} \tag{14}$$

As $P^{(u)}$ is a right stochastic matrix, $\psi^{(u)}(k)$ and $\phi^{(u)}(k)$ will also be right stochastic matrices, so that $\sum_{j=1}^{z} \psi_{i,j}^{(u)}(k)=\sum_{j=1}^{z}\phi_{i,j}^{(u)}(k)=1\ \forall i,j\in \mathbb{C}$ $\phi_{i,j}^{(u)}(k)$ gives the probability that a user is in cell j after k time from time instant when he made a transition from one place to cell i. However, to predict the location of a user at every k' time steps, the probability $\hat{\phi}_{i,j}^{(u)}(k', s)=P(X_{s+k'}^{(u)}=j|X_0^{(u)}=i, t_{soj}=s)$ has to be estimated. That probability is the probability that a user is in cell j after k' time given that the current cell is i and a user has stayed in cell i for a sojourn time $t_{soj}=s$. It can be evaluated as:

$$\hat{\phi}_{i,j}^{(u)}(k', s) = \frac{P\left(X_{s+k'}^{(u)} = j,\ t_{soj} = s \mid X_0^{(u)} = i\right)}{P\left(t_{soj} = s \mid X_0^{(u)} = i\right)} \tag{15}$$

$$\hat{\phi}_{i,j}^{(u)}(k', s) = \frac{h_{i,j}^{(u)}(s+k') + \sum_{m=1}^{z} \sum_{\tau=s+1}^{s+k'} v_{i,m}^{(u)}(\tau)\phi_{m,j}^{(u)}(s+k'-\tau)}{1 - \Lambda_i^{(u)}(s)} \tag{16}$$

For s=0: $\hat{\phi}_{i,j}^{(u)}(k', s)=\phi_{i,j}^{(u)}(k)$. A steady state distribution of a semi-Markov model is leveraged to analyze a long-term cell association of the users. This can help to identify the cells where users spend most of the time and further can be utilized to validate the proposed framework. The steady-state distribution of the semi-Markov $\zeta^{(u)}=[\zeta_1^{(u)}, \zeta_2^{(u)}, \zeta_3^{(u)}, \ldots, \zeta_c^{(u)}]$ is given as:

$$\zeta_i^{(u)} = \frac{\pi_i^{(u)}\Upsilon_i^{(u)}}{\sum_{k=1}^{c} \pi_i^{(u)}\Upsilon_i^{(u)}},\ 1 \le j \le c \tag{17}$$

where $[\pi_1^{(u)}, \pi_2^{(u)}, \pi_3^{(u)}, \ldots, \pi_z^{(u)}]$ is a positive solution to the following balance equations:

$$\pi_j^{(u)} = \sum_{i=1}^{z} \pi_i^{(u)} p_{i,j}^{(u)},\ 1 \le j \le c \tag{18}$$

-continued $$\sum_{i=1}^{z} \pi_i^{(u)} = 1 \tag{19}$$

and $\gamma_j^{(u)}$, $1 \le j \le c$ is the mean sojourn time of user 'u' in cell j.

Utilizing the past handover history of user 'u' <time, Cell ID>, probability transition matrix $P^{(u)}$ and sojourn time distribution matrix $S^{(u)}$ can be initialized as follows [37]:

$$p_{i,j}^{(u)} = \frac{N_{i,j}^{(u)}}{N_i^{(u)}} \tag{20}$$

and $$S_{i,j}^{(u)}(k) = \frac{N_{i,j,k}^{(u)}}{N_{i,j}^{(u)}} \tag{21}$$

where $N_{i,j}^{(u)}$ is the number of handovers of user 'u' from cell i to j, $N_{i,j,k}^{(u)}$ is the number of handovers of user 'u' from cell i to j with sojourn time less than or equal to k, and $N_i^{(u)}$ is the total number of handovers of user 'u' from cell i. Whenever there is a handover from cell i to j, it updates $p_{i,j}$ and $S_{i,j}(k)$ and computes $\psi_{i,j}^{(u)}(k)$ and $\Lambda_i^{(u)}(k)$. Finally, $\phi_{i,j}^{(u)}(k)$ and $\hat{\phi}_{i,j}^{(u)}(k', s)$ are computed. The cell with the highest probability is chosen as the predicted future destination so that $$\max \hat{\phi}_{i,j}^{(u)}(k', s),$$

where $\mathbb{N}_i$ is set of all neighboring cells of cell i. In this way, after every k' time steps, the next handover tuple information for each UE $\{\mathbb{C}_N^u, \mathbb{T}_{HO}^u\}$ is generated, where $\mathbb{C}_N^u$ is a next probable cell of user 'u' at time $\mathbb{T}_{HO}^u$.

Future Location Estimation

The UE's current location coordinates at time instant 'k' is assumed to be $l_k^u=(x_k^u, y_k^u)$ and the next cell handover tuple information for each UE is assumed to be $\{\mathbb{C}_N^u, \mathbb{T}_{HO}^u\}$. That information is used for estimating the UE's future location coordinates in a next time step k+k'. Knowing that nodes in a network usually move around a set of well-visited landmarks with a fairly regular landmark trajectory, past mobility logs of UEs are used to estimate most probable landmarks visited by each UE in each cell. This information is then utilized to estimate a direction of trajectory from a current location while a distance to be travelled in that direction is estimated using a next cell handover time $\mathbb{T}_{HO}$. Assuming the coordinates of a most probable landmark for UE 'u' in a next cell '$\mathbb{C}_N^u$' are $l_{\mathbb{C}_N^u}^{LM}=(x_{\mathbb{C}_N^u}^{LM}, y_{\mathbb{C}_N^u}^{LM})$, then a unit vector $\hat{u}$ originating from the current coordinates in a direction of $(x_{\mathbb{C}_N^u}^{LM}, y_{\mathbb{C}_N^u}^{LM})$ is given as:

$$\hat{u} = \frac{\left[l_{\mathbb{C}_N^u}^{LM} - l_k^u\right]}{\left\|\left(l_{\mathbb{C}_N^u}^{LM} - l_k^u\right)\right\|} \tag{22}$$

where ||•|| is Euclidian norm. The future coordinates at time step k+k' can be estimated as:

$$l_{k+k'}^u = l_k^u + \frac{\sqrt{\left(x_{\mathbb{C}_N^u}^{LM} - x_k^u\right)^2 + \left(y_{\mathbb{C}_N^u}^{LM} - y_k^u\right)^2}}{\mathbb{T}_{HO}^u} * k' * \hat{u} \tag{23}$$

Figure 3:
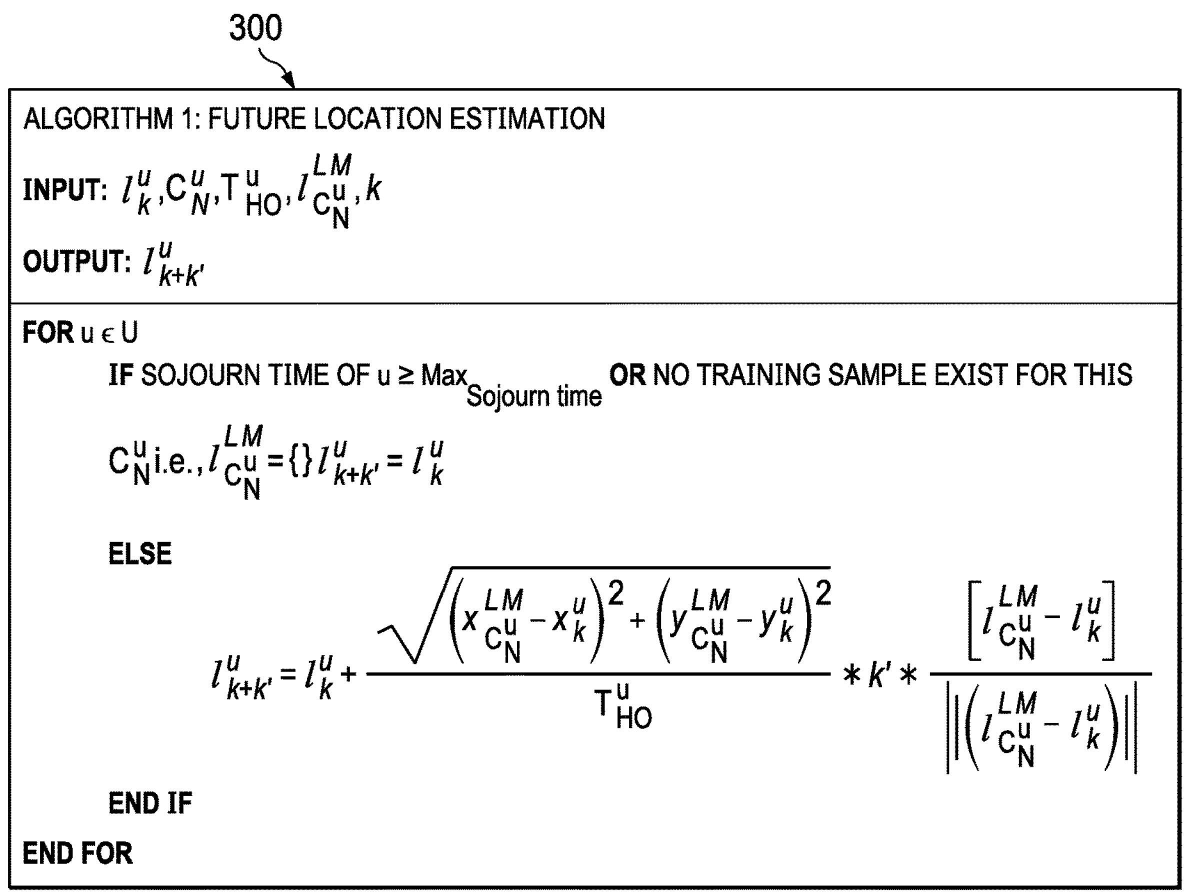
FIG. 3 is a pseudocode for a next location estimation algorithm.

FIG. 3 is a pseudocode 300 for a next location estimation algorithm.

Energy Saving Optimization

Given the next probable handover tuple and estimated future location $l_{k+k'}^u$ for all users, an on/off sleeping mechanism for small cells for a next time step k+k' is devised to minimize network wide energy consumption. The sleeping schedule is ensured to satisfy coverage KPI and QoS requirement of each UE located at its estimated future location $l_{k+k'}^u$ as well as satisfying a maximum loading constraint for each BS. The total instantaneous power consumption of a cell can be given by the sum of circuit and the transmit power as:

$$P_c^{total} = \lambda_c (P_{ct}^c + \eta_c P_t^c) \tag{24}$$

where $P_{ct}^c$ is the constant circuit power which is drawn if a BS in cell c is active and is significantly reduced if the BS goes into sleep mode, $P_t^c$ is the transmit power of cell c, $\eta_c$ denotes the load and $\lambda_c$ is an indicator variable that will be 1(0) for an on/off BS in cell c. One way to quantify energy savings is to leverage the performance metric criterion ECR. The ECR for a cell is defined as the amount of energy consumed in Joules per each bit of information that is reliably transmitted in that cell calculated as:

$$ECR_c = \frac{P}{\sum_{u_c} \omega_B^u * f(\gamma_u^c)} \left(\frac{\text{Joules}}{\text{bit}}\right) \tag{25}$$

where $f(\gamma_u^c)$ is a function that returns achievable spectral efficiency of user u at a given SINR $\gamma_u^c$ and $\omega_B^u$ is the bandwidth assigned to user u. $f(\gamma_u^c)$ can be defined to take into account post-processing diversity gains such as the ones harnessed by MIMO or loss incurred by system-specific overheads using $f(\gamma):=A \log_2(1+B(\gamma))$. Here, A and B are constants taken as 1 in the simulations studies without loss of generality. The SINR $\hat{\gamma}_u^c$ at an estimated user location $l_{k+k'}^u$ at time step k+k' when associated with a cell c is defined as the ratio of a reference signal received power $P_{r,u}^c$ by user u from cell c to the sum of a reference signal received power by user u from all cells i such that $\forall i \in \mathbb{C}/c$, and the noise variable $\kappa$:

$$\hat{\gamma}_u^c(k+k') = \left[\frac{P_t^c G_u G_u^c \delta \alpha (d_u^c)^{-\beta}}{\kappa + \sum_{\forall i \in \mathbb{C}/c} P_t^i G_u G_u^i \delta \alpha (d_u^i)^{-\beta}}\right]_{k+k'} \tag{26}$$

where $P_t^c$ is the transmit power of cell c, $G_u$ is the gain of user equipment, $G_u^c$ is the gain of a transmitter antenna of the cell c as seen by the user u, $\delta$ is the shadowing observed by the signal, $\alpha$ is the path loss constant, $d_u^c$ represents the distance of estimated user location of u i.e., $l_{k+k'}^u$ from cell c and $\beta$ is the pathloss exponent. The time subscript on the right hand side of (26) indicates that all terms enclosed within $[\bullet]_{k+k'}$ are considered for the next time step k+k'. It is assumed that shadowing estimate information for the estimated user location is available with a normally distributed error. In a practical network, channel maps building on the minimization of drive test reports recently standardized by 3GPP and CQI reports collected can be utilized to estimate channel gains in estimated locations. $\hat{\gamma}_{u,k+k'}^{c}$ is a fully-loaded SINR expression and is valid only when all cells are fully utilized. The actual interference from neighboring cells based on their respective loads is utilized as follows to calculate the SINR for data transmission:

$$\gamma_u^c(k+k') = \left[\frac{P_t^c G_u G_u^c \delta\alpha(d_u^c)^{-\beta}}{\kappa + \sum_{\forall i \in \mathbb{C}/c} \eta_i P_t^i G_u G_u^i \delta\alpha(d_u^i)^{-\beta}}\right]_{k+k'} \quad (27)$$

where $\eta_i$ denotes a cell load in a cell i at time step k+k'. This way of weighting the interference power received from each cell with its current resource utilization yields a certain coupling of the total interference with different cell utilizations. More loaded cells contribute more interference power than less loaded ones. For an LTE network, instantaneous cell load can be defined as the ratio of PRBs occupied in a cell during a TTI and total PRBs available in the cell. This indicator is available as a standard measurement in LTE as "uplink/downlink total PRB usage." The number of PRBs allocated to each user depends on the QoS that the user requires and an achievable SINR. For instance, if the QoS is defined in terms of the required data rate, more PRBs are assigned to a user with a higher rate requirement or one with a lower SINR. The total load of cell 'c' at time step k+k' will be the fraction of the total resources in the cell required to achieve a required rate of all users of a cell given as:

$$\eta_c(k+k') = \left[\frac{1}{N_c}\sum_{\mathbb{u}_c} \frac{\check{\tau}_u}{\omega_B \log_2(1+\gamma_u^c)}\right]_{k+k'} \quad (28)$$

where $\omega_B$ is the bandwidth of one resource block, $N_c$ is the total number of resource blocks in cell c, $\check{\tau}_u$ is the minimum required rate of the user, and $u_c$ is the number of active users connected to a cell 'c'. It is a virtual load as it is allowed to exceed one to give us a clear indication how overloaded a cell is. The required rate in the numerator is the minimum bit rate required by the user depending upon the QoS requirements of the services and user subscription level. In LTE, there does not exist a method to estimate the throughput required by the user. Only historical throughput of the user can be estimated after an allocation of resources. However, 3GPP standards do define a metric called QCI. The primary purpose of QCI is to prioritize users based on their required resource type, packet delay susceptibility, and packet error loss rate. The definition of desired throughput can build on QCI. In a more robust approach leveraging network analytics, $\check{\tau}_u$ can be modelled as a function of subscriber behavior, subscription level, service request patterns, and the applications being used. The set of users connected to cell c is determined by the user association criterion:

$$\mathbb{u}_j := \left\{\forall\, u \in \mathbb{u} \mid j = \underset{\forall c \in \mathbb{C}}{\operatorname{argmax}}(P_{r,u}^c + P_{CIO}^c)\right\} \quad (29)$$

where $P_{r,u}^{c}$ is the true reference signal power in dBm received by user u from cell c and $P_{CIO}^{c}$ is the bias parameter CIO. This CIO is primarily used to offset a lower transmit power of small cells to transfer more load to them. In case some underutilized cells are turned off, remaining cells need to have maximum utilization to cater the transferred load from underutilized cells. However, the downside of biasing is that UEs are no longer necessarily connected to the strongest cell. As a result, SINR is bound to be lower with higher CIO values. However, CIO is still a necessary measure to balance the loads. The capacity loss due to the drop in SINR can partially be offset if the serving cell has more free PRBs that can be allocated to that user, compared to PRBs in the previous serving cell to satisfy the required QoS. This highlights the importance of CIO to control the tradeoff among network load balancing, CCO, and energy consumption. In case of energy saving optimization with guaranteed minimum QoS requirements, it might not make sense to look at throughputs since the UEs either get exactly the constant bit rate or they are unsatisfied. Hence, a more appropriate performance metric to analyze is the number of unsatisfied or dropped users '$N_{us}$' given as:

$$N_{us}(k+k') = \left[\sum_c \max\left(0, \sum_{\mathbb{u}_c} 1\cdot\left(1-\frac{1}{\eta_c}\right)\right)\right]_{k+k'} \quad (30)$$

where $\Sigma_{\mathbb{u}_c}$ 1. sums up to a total number of users in cell c while $$\left(1-\frac{1}{\eta_c}\right)$$

is a modulation parameter indicating what percentage of users in that cell are unsatisfied. Here, $\eta_c$ is allowed to exceed 1 to give a clear indication how overloaded a cell is. When $\eta_c$=1, the inner summation in will be zero, meaning all users in cell c are satisfied. When $\eta_c$=2, the inner summation will be equal to half of the number of users of cell c, meaning half of the users are satisfied. An outer summation sums up to a total number of unsatisfied users in the whole network while a max operator is used since the number of unsatisfied users cannot be negative in underloaded cells. The unsatisfied users would not be admitted to enter the system or they would be dropped if they are already active.

Now the general energy consumption minimization problem for time step k+k' is as follows:

$$\min_{\lambda^c, P_{CIO}^c} \sum_C [ECR_c]_{k+k'} \quad (31)$$

$$\min_{\lambda^c, P_{CIO}^c} \sum_C \left[\frac{\lambda^c \cdot (P_{ct}^c + \eta_c P_t^c)}{\sum_{U_c} \omega_u^c \cdot \log_2\left(1 + \frac{P_t^c G_u G_u^c \delta\alpha(d_u^c)^{-\beta}}{\kappa + \sum_{\forall i \in \mathbb{C}/c} \eta_i P_t^i G_u G_u^i \delta\alpha(d_u^i)^{-\beta}}\right)}\right]_{k+k'} \quad (32)$$

where $\mathbb{u}_j := \left\{\forall\, u \in \mathbb{u} \mid j = \underset{\forall c \in \mathbb{C}}{\operatorname{argmax}}(P_{r,u}^c + P_{CIO}^c)\right\}$ subject to:

-continued $$P_{CIO.min} \leq P^c_{CIO} \leq P_{CIO.max} \forall c \in \mathbb{SC} \tag{33}$$
$$\lambda^c \in \{0, 1\} \forall c \in \mathbb{SC}$$
$$\frac{1}{|\mathbb{C}|}\sum_{\mathbb{C}}\frac{1}{|\mathbb{U}_c|}\sum_{\mathbb{U}_c} 1(P^c_{r,u} \geq P^c_{th}) \geq \varpi$$
$$\tau_u \geq \check{\tau}_u \forall u \in \mathbb{U}$$
$$\eta_c \leq \eta_T \forall c \in \mathbb{C}$$

The objective is to optimize the parameters $\lambda^c$, $P_{CIO}{}^c$ of small cells ($\mathbb{SC}$) such that an energy consumption ratio in all cells is minimized while ensuring coverage reliability and satisfaction of user throughput requirements. The first two constraints define the limits for the CIOs and on/off state array, respectively. These are the constraints that will determine the size of solution search space. The third constraint is to ensure minimum coverage. Here, $P_{th}{}^c$ is the threshold for the minimum received power for a user to be considered covered, $\overline{\omega}$ defines the area coverage probability that an operator wants to maintain, and 1(•) denotes an indicator function. The fourth constraint ensures each user gets the required minimum bit rate depending upon the QoS requirements of the service and user's subscription level. This is due to the fact that to achieve an ECR minimization objective, a CIO of the remaining on small cells may be increased to offload users of switched off cells into their coverage umbrella. The consequences are that the received power $P_{r,u}{}^c$ of offloaded users may become worse, leading to a degraded SINR and throughputs. The effect of a decreased SINR can be offset by allocating more resources only if the received power by the user is above a certain threshold. Therefore, this fourth constraint ensures that a minimum throughput is guaranteed for all users in all cases. However, this can only happen when the number of resources available in a cell are sufficient to meet a user requirement, therefore, this constraint is complemented with a constraint on cell load $\eta_c<\eta_T$ with $\eta_T \in (0,1]$.

For load balancing, the optimization objective will become:

$$\min_{P^c_t, \psi^c_{tilt}, \phi^c_a, B^c_v, B^c_h, P^c_{CIO}} \sum_c [-\log(1 - \eta_C(P^c_t, \psi^c_{tilt}, \phi^c_a, B^c_v, B^c_h, P^c_{CIO}))]_{k+k'} \tag{34}$$

where $\psi_{tilt}{}^c$ is the tilt angle of serving cell antenna, $B_h$ and $B_v$ are the horizontal and vertical beam widths of the transmitter antenna of cell c respectively, $\phi_a{}^c$ is the azimuth of antenna of cell c. Since $\eta_c$ denotes the resource utilization of cell 'c', term $(1-\eta_c)$ represents the amount of resources available at cell 'c'. The objective is to optimize the parameters $P_t{}^c$, $\psi_{tilt}{}^c$, $\phi_a{}^c$, $B_v{}^c$, $B_h{}^c$, $P_{CIO}{}^c$ such that logarithmic sum of idle resources in all cells is maximized while ensuring coverage reliability and satisfaction of user throughput requirements. The log utility function leads to a kind of proportional fair treatment of the individual cells. Given the next probable HO tuple and estimated future location $l_{k+k'}{}^u$ for all users, load balancing optimization for next time step k+k' is solved in such a way that network load is minimized while satisfying coverage KPI and QoS requirement of each UE located at its estimated future location $l_{k+k'}{}^u$ as well as satisfying maximum loading constraint for each BS.

The formulated combinatorial optimization problem in (32-33) contains both continuous $P_{CIO}{}^c$ and binary $\lambda^c$ decision variables. It can be identified as an MINLP problem. The inherent coupling of the on/off state vector, CIOs, and cell loads indicate it is a large-scale non-convex optimization problem. There are two problem parameters per cell whose effects on the optimization function are not independent, so the complexity is expected to grow exponentially with the number of cells. Hence, an exhaustive search for the optimal parameters may not be practical for a large network due to a high-complexity time search that needs to be done in real time. For a practical scenario with 50 small cells and only CIO as an optimization variable with ten possible values available at each small cell, there are $10^{50}$ possible settings. This is approximately equal to the number of atoms on earth. Therefore in order to solve the formulated energy saving problem, a genetic algorithm is used. The reason being is that it is an attractive heuristic technique for a multi-variable MINLP problem with a large variable count and enormous search space. Due to its random nature, the genetic algorithm significantly improves the chance of finding a global solution, especially for highly non-linear objective functions. It is also important to note that the genetic algorithm starts from a random parameter set in the solution space and does not require a feasible point to start a search. Consequently, based on an estimated network state for time step k+k', AURORA devises an optimal on/off state array and CIO values for all the small cells ahead of time such that an energy consumption ratio of the whole network is minimized. The on/off state array and CIO values remain fixed from k to k'. As in a practical network, small cells need some non-zero time in switching their state, so the proposed strategy gives ample time of k' duration for small cells to switch to an optimal on/off state.

Performance Analysis

First, the mobility prediction accuracy of the semi-Markov based model is analyzed. Second, the potential energy savings resulting from the application of AURORA on HetNets is analyzed. Its performance is benchmarked against four schemes (i): NARN, where it is assumed that AURORA estimates future location and channel estimate at that location with 100% accuracy; (ii): AllOn-HomNet, where all cells are on and no CIO is utilized for small cells; (iii) AllOn-HetNet, where all cells are on and a fixed CIO of 10 dB is utilized for all small cells; and (iv) a reactive scheme that is simulated by delaying user location information, i.e., optimization with $\eta_T$=1 is done based on location information of past one minute.

Simulation Settings: A typical macro and small cell based network and UE distributions leveraging LTE 3GPP standard compliant network topology simulator was generated in MATLAB. The simulation parameters details are given in Table I.

TABLE 1

Simulation Parameter Settings

| System Parameters | Values |
|---|---|
| Number of Base Stations | 7 |
| Sectors per Base Station | 3 |
| Small Cells per Sector | 5 |
| Number of UEs | Mobile: 84, Stationary: 336 |
| Mobility Model | SLAW |
| Transmission frequency | 2 GHz |
| Transmission Bandwidth | 10 MHz |
| Network Topology | Hexagonal |

TABLE 1-continued

Simulation Parameter Settings

| System Parameters | Values |
|---|---|
| Small Cell distribution | Uniform within Sector |
| UE distribution | Non-uniform with independent hotspots |
| UE Traffic Demand | Low Traffic Demand: 5 classes (Voice, Text Browsing, Image Browsing, FTP, Video) uniformly distributed<br>High Traffic Demand: All Video users |
| Macro Cell Tx Power | 46 dBm |
| Macro Cell Tilt | $102^0$ |
| Small Cell Tx Power | 30 dBm |
| Small Cell CIO | Max: 10 dB, Min: 10 dB |
| Cellular System | LTE |
| Network Deployment Clutter | Urban |
| Macro Cell Height | 25 m |
| Small Cell Height | 10 m |
| UE Height | 1.5 m |
| Inter-site Distance | 500 m |
| Area Coverage Probability $\overline{\omega}$ | 100% |
| Prediction Interval k' | 1 minute |
| Total Simulation Duration | 60 minutes |
| Benchmarks | (i) NARN: AURORA with 100% accurate estimation of future location and channel characteristics<br>(ii) AllOn-HomNet: All Small Cells ON, CIO: 0 dB<br>(iii) AllOn-HetNet: All Small Cells ON, CIO: 10 dB |

A wrap-around model simulates interference in an infinitely large network, thus avoiding boundary effects. To model realistic networks, UEs were distributed non-uniformly in the coverage area such that a fraction of UEs were clustered around randomly located hotspots in each sector. Monte Carlo style simulation evaluations estimated average performance of the proposed framework. A SLAW mobility model was used. Contrary to the conventional random walk models, where movement at each instant is completely random and chosen randomly from a set of allowed speed and angles, SLAW has been shown to be a highly realistic mobility model. It exhibits all the characteristics of real-world human mobility, including the following: (i) truncated power-law flights and pause-times: the lengths of human flights, which are defined to be straight line trips without directional change or pause, have a truncated power-law distribution; (ii) heterogeneously bounded mobility areas: people mostly move only within their own confined areas of mobility and different people may have widely different mobility areas; (iii) truncated power-law inter-contact times: the times elapsed between two successive contacts of the same persons follows truncated power law distribution; and (iv) fractal waypoints: people are more attracted to more popular places. Therefore, the accuracy of AURORA tested using mobility traces generated by SLAW is very likely to represent its true performance in a real network. The SLAW mobility model was utilized to generate handover traces of 84 mobile users for one week, out of which traces for the first six days were utilized to build and train semi-Markov mobility model for each of the 84 UEs. Moreover, an additional 336 stationary UEs (80% of total UEs) were deployed to generate additional loading on the network.

For traffic demand, two scenarios were considered: (i) low traffic demand comprising five different uniformly distributed UE traffic requirement profiles corresponding to 24 kbps (voice), 56 kbps (text browsing), 128 kbps (image browsing), 512 kbps (FTP), and 1024 kbps (video) desired throughputs; and (ii) high traffic demand, where all UEs are video users. Without a loss of generality and keeping operational complexity in mind, the prediction interval k' was set as 1 minute in our simulation study.

Mobility Prediction Accuracy: For benchmarking prediction accuracy of the semi-Markov based model trained on six days training data, (13) and (16) were used to predict serving cells of all UEs for the next whole day after every k' time step.

Figure 4:
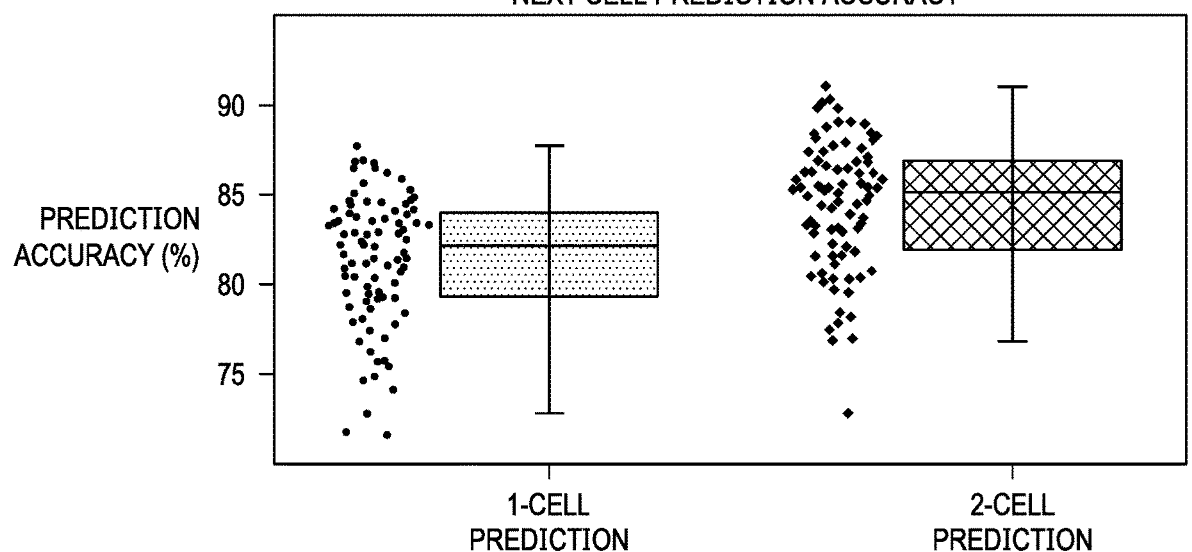
FIG. 4 is a combined scatter and box plot of next cell prediction accuracy.

FIG. 4 is a combined scatter and box plot 400 of next cell prediction accuracy. Accordingly, a maximum prediction accuracy of 87.70% was achieved, and a mean value of 81.46% was achieved when choosing the top most probable cell among all future next cell candidates (1-cell prediction). The predictor performs exceptionally well since prediction the interval is only one minute. This prediction can be enhanced further by decreasing a k' interval length with a corresponding increase in computational complexity. The effect of choosing the two top most probable future next cell candidates (2-cell prediction) was also analyzed. The prediction accuracy got a little boost with a mean value reaching up-to 84.39%. However, this gain is not that significant given it already has very high accuracy.

Next, based on next cell handover tuple information for each UE $\{\mathbb{C}_N{}^u, l^{LM}_{\mathbb{C}_N^u}{}_{HO}{}^u\}$, future location coordinates were estimated using algorithm 1 for all UEs for a one hour simulation duration after every k' time steps.

Figure 5:
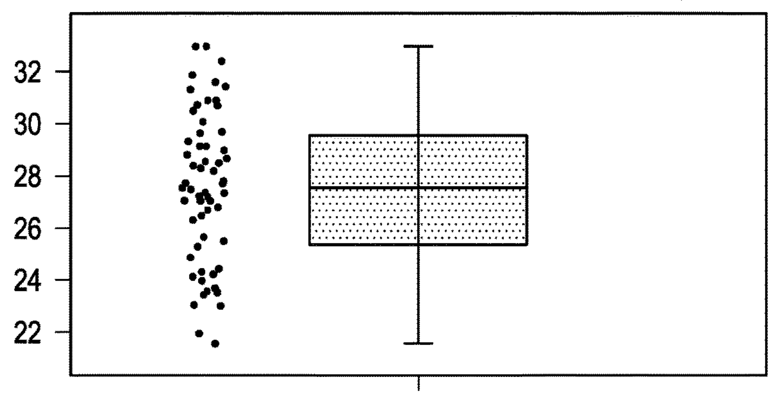
FIG. 5 is a combined scatter and box plot of an average estimation performance.

FIG. 5 is a combined scatter and box plot 500 of an average estimation performance. A maximum distance error between estimated and actual coordinates was around 33 meters, and a mean value was around 27.5 meters. The location estimation algorithm performed exceptionally well. One particular reason for high accuracy is that the SLAW model is for pedestrian users. Therefore, a location of a user changes slowly as a function of time and thus remains relatively more predictable. With high speed, accuracy is expected to degrade, but then knowledge of the street layout can be exploited to maintain accuracy. Similar to next cell prediction accuracy, the estimation performance can be enhanced further by decreasing a k' interval length with a corresponding increase in computational complexity.

FIG. 6 is a graph 600 of average location estimation error. The symmetric shape of the box plot and the absence of outliers in the combined scatter and box plot 500 suggest that a normal distribution is a good approximation for the average location estimation error distribution as also shown by the graph 600.

FIG. 7 is a bar chart 700 comparing an ECR for AURORA to ECRs of other schemes.

Quantifying Energy Saving Potential of AURORA: The bar chart 700 shows ECRs for low and high traffic demands with varying values of load thresholds $\eta_T$ along with that of AllOn-HomNet, AllOn-HetNet, and reactive schemes averaged over 1 hour duration. For visualizing ECR ranges for both traffic classes in the same figure, the y-axis has been plotted in logarithmic scale. The load threshold range is [0.6, 1] since below 0.6 there was no feasible point returned by the P-ES optimization algorithm (31-33). ECR values are higher for a high traffic demand scenario as more small cells need to be switched on to accommodate a high load. Moreover, AURORA exhibits a linearly decreasing trend with increasing values of $\eta_T$. It is significantly much less than the conventional AllOn schemes for all load threshold values because, for AllOn schemes, all cells are ON at all times, thus increasing energy consumption, which is bound to further escalate with densification. At lower $\eta_T$ values, the ECR for AURORA is higher since a smaller $\eta_T$ value compels the AURORA to keep on a larger number of underutilized small cells. For instance, at $\eta_T$=0.6, AURORA switches on a next small cell as soon as the utilization of current on small cells reach 60%. Thus, on average, a large number of small cells will be turned on for smaller $\eta_T$ values, thus increasing energy consumption. Moreover, with a large number of small cells turned on, there is a higher chance that location estimation inaccuracy results in turning on small cells with a very low load or no load and thus a very high ECR. On the other hand, larger values of $\eta_T$ enable AURORA to switch off a large number of small cells. For instance at $\eta_T$=1, AURORA will switch on a next small cell only when the utilization of current on small cells reaches 100%. As a result, ECR is expected to decrease and the same trend is observed for NARN. On one hand, with an increasing value of $\eta_T$, a smaller number of small cells are turned on, thus there is less of a chance of any turned on small cells with a very low load or no load. On the other hand, with increasing $\eta_T$ values, AURORA switches on the smallest possible number of small cells and all of them are almost fully utilized with very few resources to spare. As a result, inaccuracy in location estimation will result in an increased risk of blocking of the UEs, hence an increased number of unsatisfied users, thereby negatively affecting QoS. However, as a number of fully utilized small cells is a more dominant factor in determining overall ECR as compared to a slight increase in the number of unsatisfied users, overall ECR reduces. The comparison of AURORA with a reactive scheme shows that ECR for a reactive scheme is higher as compared to AURORA. This is because in the reactive scheme, due to delayed user location information, outdated configuration settings that are suboptimal for a current instant are applied to the network. This increases the percentage of unsatisfied users by, on average, 1.85% with AURORA at $\eta_T$=1, but 4% with the reactive scheme at a high traffic load and hence higher ECR. Moreover, ECR for AllOn-HomNet is slightly higher as compared to AllOn-HetNet. This is because higher CIO values used in AllOn-HetNet compels small cells to be more utilized and hence reduced ECR as compared to AllOn-HomNet scheme.

The potential energy savings resulting from the application of AURORA Framework on HetNets is further quantified by computing Energy Reduction Gain (ERG) [40], [41] performance metric given as:

$$ERG = \left(\frac{ECR_{Benchmark} - ECR_{AURORA}}{ECR_{Benchmark}}\right) \times 100\% \tag{35}$$

Figure 8A:
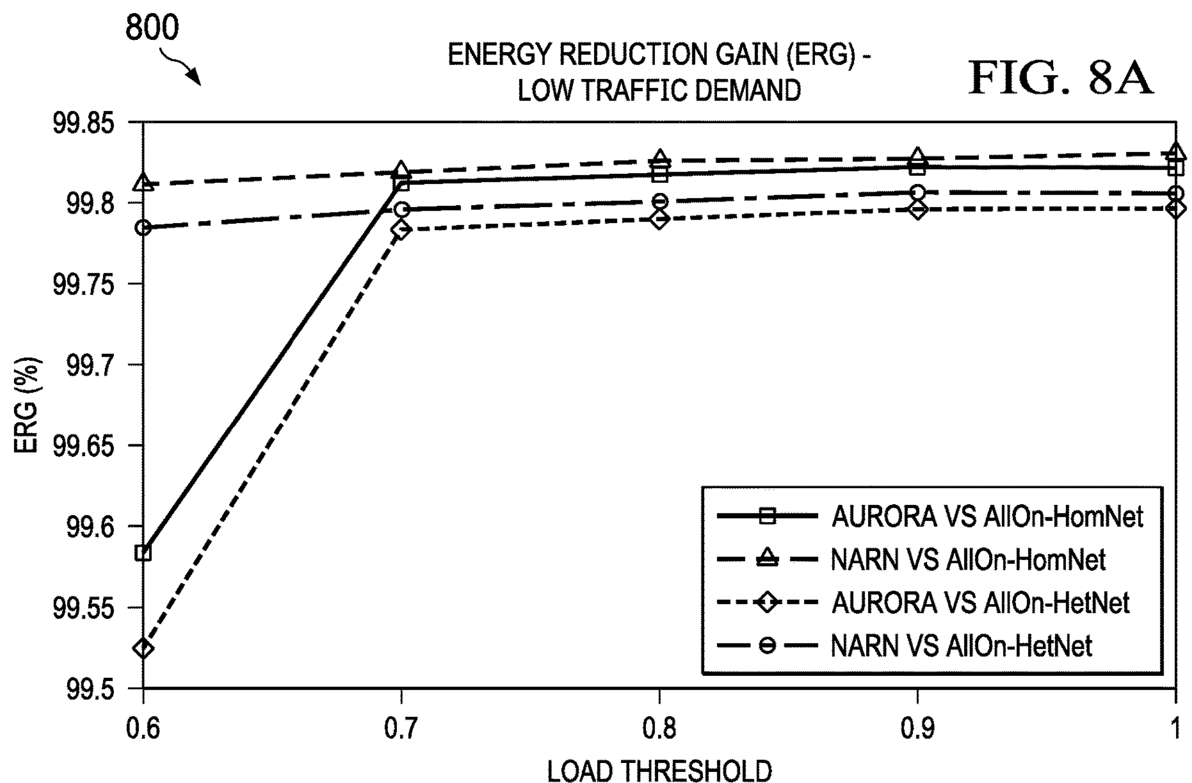
FIG. 8A is a graph comparing an ERG for AURORA to ERGs for other schemes with a low traffic demand.
Figure 8B:
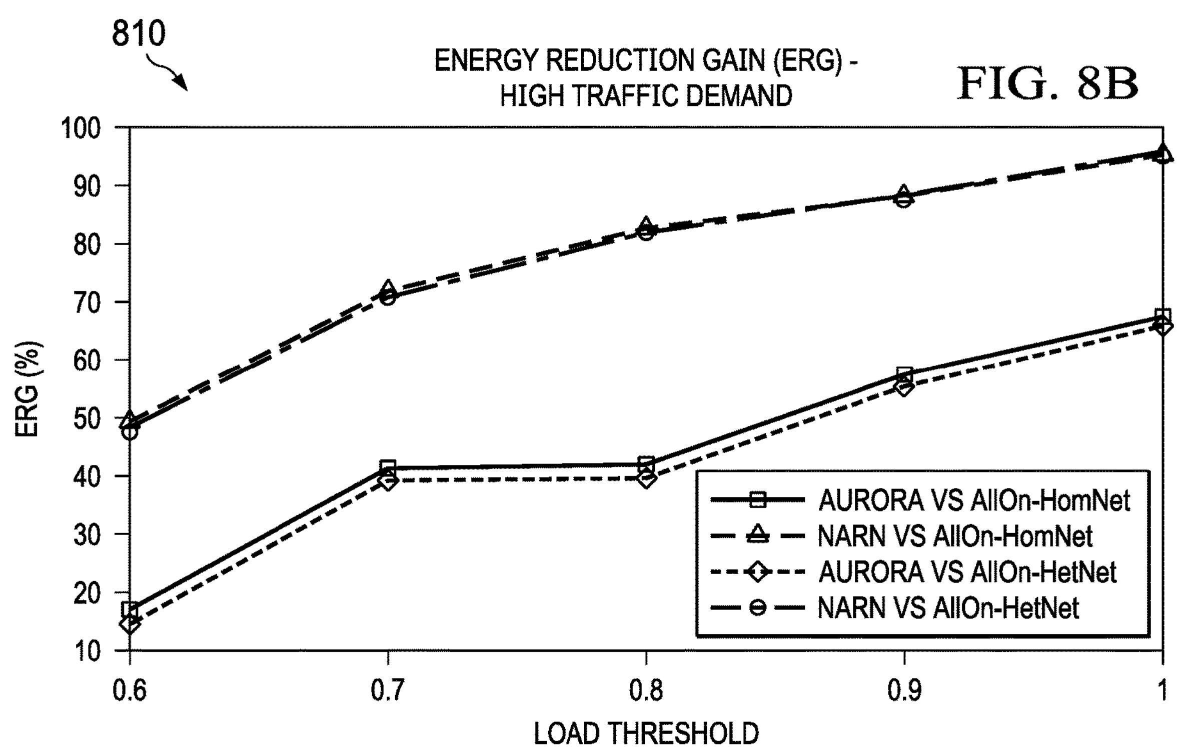
FIG. 8B is a graph comparing an ERG for AURORA to ERGs for other schemes with a high traffic demand.

FIG. 8A is a graph 800 comparing an ERG for AURORA to ERGs for other schemes with a low traffic demand. FIG. 8B is a graph 810 comparing an ERG for AURORA to ERGs for other schemes with a high traffic demand. The ERGs are average ERGs with varying values of load thresholds $\eta_T$ against AllOn-HomNet and AllOn-HetNet schemes averaged over 1 hour duration. For low traffic demand at $\eta_T$=0.6, up to a 99.5% ERG is achieved with AURORA that rises to around 99.8% with $\eta_T$=1, which is equivalent to that achievable with NARN. For a high traffic demand, AURORA has a low ERG of around 17% at $\eta_T$=0.6 that rises to around 68% for $\eta_T$=1. The performance gap between AURORA and NARN is higher since, at high traffic demand, the effect of location estimation inaccuracy is magnified, leading to an increased number of unsatisfied users as compared to NARN, where there is no unsatisfied user.

FIG. 9 is a bar chart 900 of an average number of small cells put to sleep with AURORA and NARN. The bar chart 900 shows varying values of $\eta_T$ for low and high traffic demand. A small number of small cells can be put to sleep for meeting needs of high traffic demand. The number of small cells put to sleep continues to increase with $\eta_T$. This is because, with an increasing value of $\eta_T$, a small cell is utilized more before turning on a next small cell. In other words, more small cells are put to sleep at higher values of $\eta_T$. Since load coupled interference also increases with $\eta_T$, an optimization algorithm returns an optimization parameters configuration ($\lambda^c$ and $P_{CIO}{}^c$) that minimizes an overall energy consumption ratio.

Figure 10A:
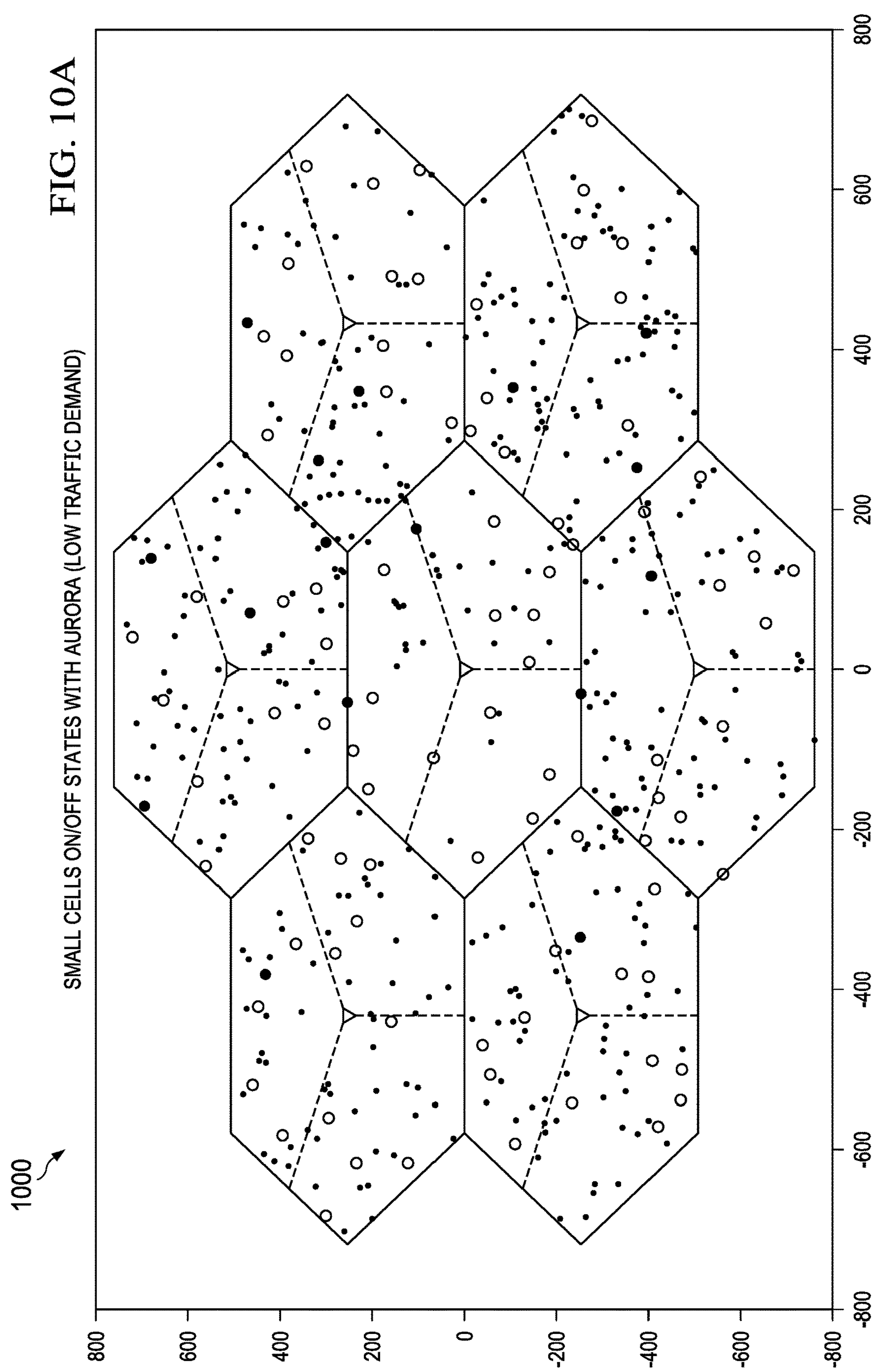
FIG. 10A is a diagram of small cell states for a low traffic demand.
Figure 10B:
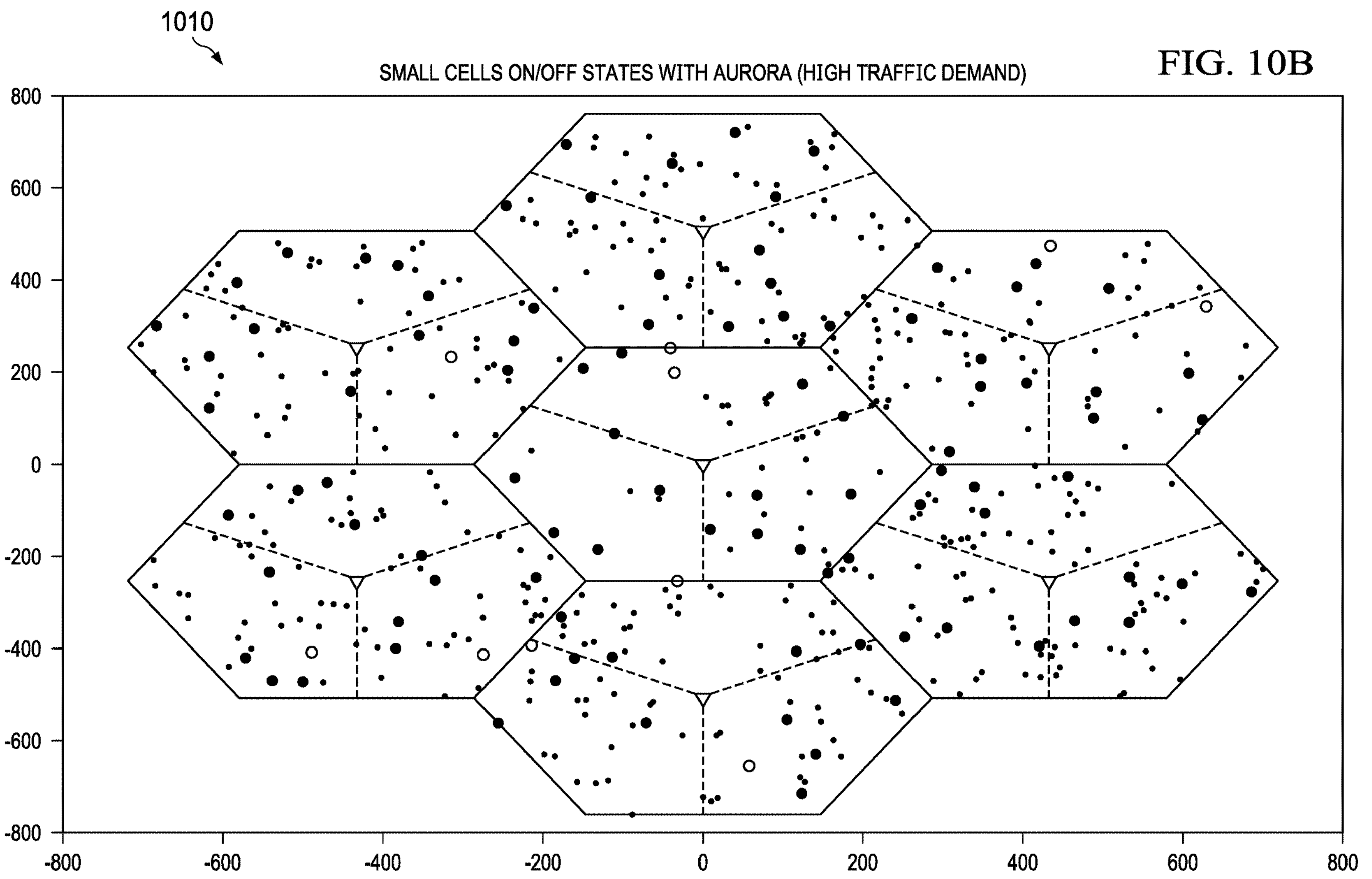
FIG. 10B is a diagram of small cell states for a high traffic demand.

FIG. 10A is a diagram 1000 of small cell states for a low traffic demand. FIG. 10B is a diagram 1010 of small cell states for a high traffic demand. The states are at the same time instants. For high traffic demand, a majority of the small cells are turned on. For brevity, subsequent results correspond to a high traffic demand scenario when it follows the same trend as for a low traffic demand.

FIG. 11 is a bar chart 1100 of an average percentage of satisfied users under AURORA versus load threshold energy efficiency. At low $\eta_T$ values, plenty of free resources are available in relatively more number of available BSs, hence more users are served with enough resources to meet their minimum QoS requirements. Even with location estimation inaccuracies, the UEs will still have a better chance to get enough resources and be satisfied. However, more small cells are turned on at low $\eta_T$ with more chance of being underutilized and hence lower energy efficiency. As an $\eta_T$ value becomes higher and approaches 1, AURORA returns such an OPC ($\lambda^c$, $P_{CIO}{}^c$) that results in the smallest possible number of switched on small cells and all of them almost fully utilized with very few resources to spare. Thus, there is a slight location estimation inaccuracy that can result in an increased risk of blocking and a decrease in the number of satisfied users. Contrary to that, fewer cells turned on with more utilization improves energy efficiency of the network. For a high traffic demand scenario, even at $\eta_T$=1, the percentage of satisfied users is above 98%.

Figure 12:
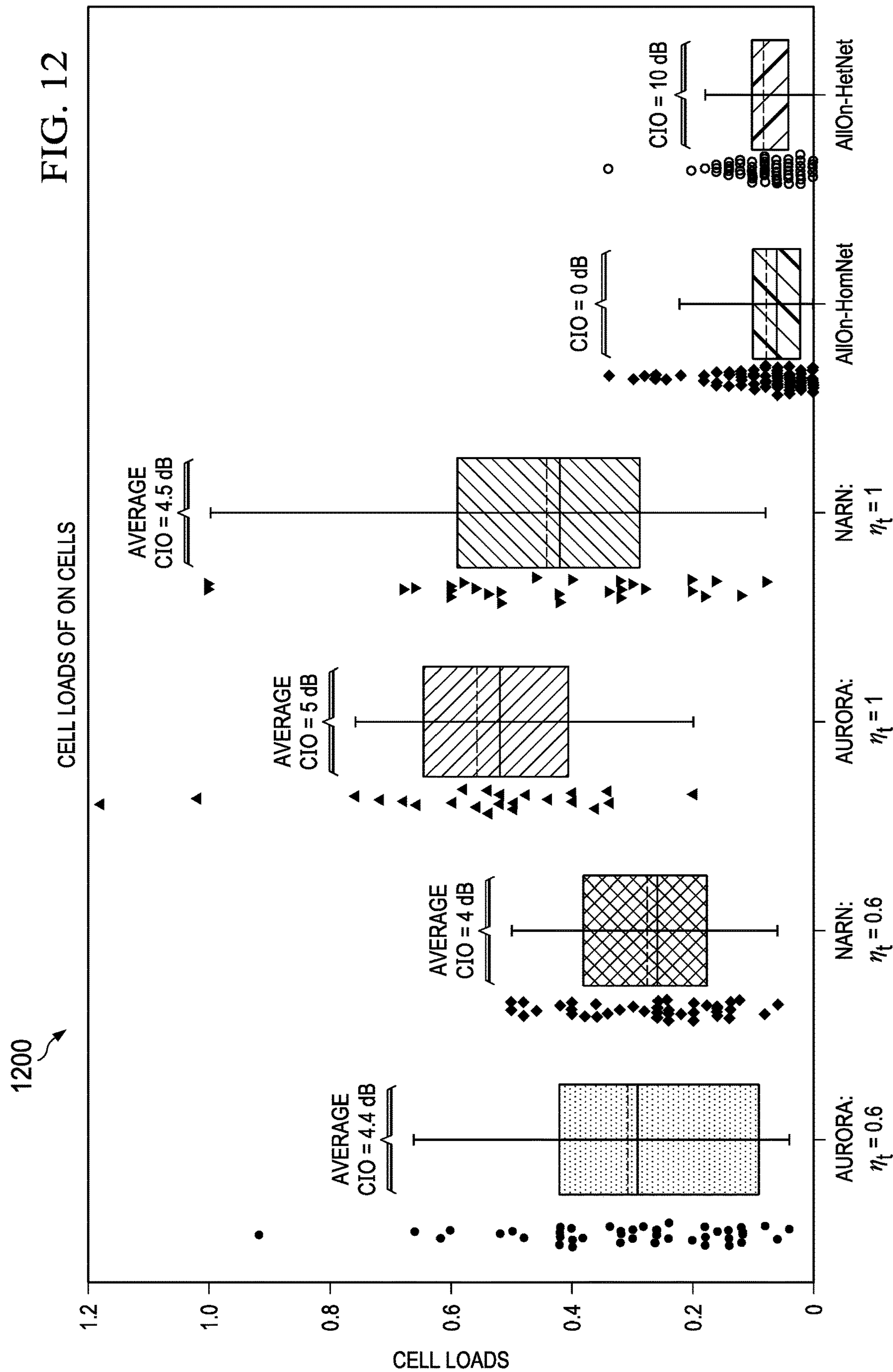
FIG. 12 is a box plot of cell loads of on cells for AURORA and NARN.

FIG. 12 is a box plot 1200 of cell loads of on cells for AURORA and NARN. In the box plot 1200, $\eta_T$=0.6 and 1, and AllOn schemes are also shown. In case of AllOn-HomNet and AllOn-HetNet, since all cells are kept on, most of the cells are underutilized with a mean utilization of 7.74% and 8% in AllOn-HomNet and AllOn-HetNet, respectively. This results in a higher ECR. With AURORA and NARN, at a lower value of $\eta_T$ i.e., 0.6, some small cells are switched off and thus utilization of remaining on cells relatively increases with a mean utilization of 30.9% and 27.6%, respectively. At a higher value of $\eta_T$, i.e., 1, a large number of smalls cells are switched off, and the few ones which are on are relatively more utilized with a mean utilization of 55.8% and 44.2%, respectively. The average CIO values are indicated on top of each box plot. At a higher $\eta_T$ value of 1 as compared to a lower value of 0.6, on average, relatively larger CIO values have been leveraged. This is because, when fewer cells are switched on, CIO values of on small cells are boosted up to serve the users of off cells. In this way, CIOs complement the proactive energy consumption optimization by serving as a guiding parameter in directing users to suitable cells such that overall ECR reduces while satisfying QoS requirements.

Figure 13:
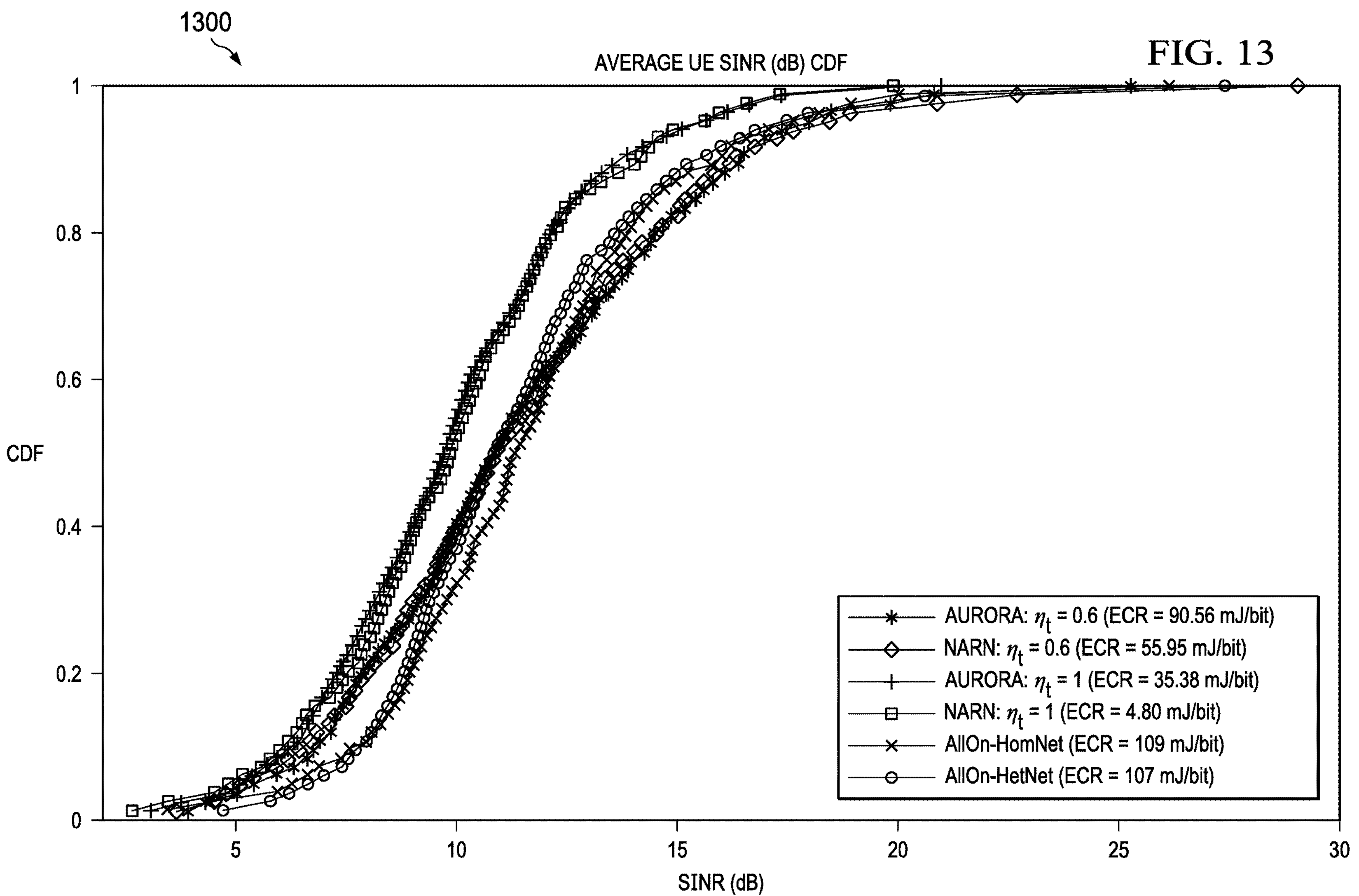
FIG. 13 is a graph of CDF versus SINR for AURORA and NARN.

FIG. 13 is a graph 1300 of CDF versus SINR for AURORA and NARN. In the graph 1300, $\eta_T$=0.6 and 1 along with the AllOn-HomNet and AllOn-HetNet for a high traffic demand scenario. At a higher value of $\eta_T$ i.e., 1, load coupled interference from neighboring BSs is very high. Therefore, SINR is negatively affected for AURORA and NARN as compared to AllOn-HomNet and AllOn-HetNet. When CIOs are leveraged, degraded SINR is a natural outcome. However, it does not mean a degraded system-wide performance as long as loss in throughput caused by a lower logarithmic SINR term is offset by an increased number of PRBs allocable to users. This is how it strives to guarantees their minimum QoS requirements as shown in FIG. 11. At a smaller $\eta_T$ value of 0.6, more small cells are turned on with a relatively smaller load. This reduces an overall interference floor in the network and hence SINR improves that is higher than that achievable at an $\eta_T$ value of 1. For AllOn-HomNet and AllOn-HetNet schemes, all small cells are on and highly underutilized, hence there is a higher SINR. However, this gain in SINR comes at a cost of higher energy consumption, so for AllOn-HomNet and AllOn-Hetnet ECR is 109 mJ/bit and 107 mJ/bit, respectively, which is much higher as compared to AURORA, which is around 36 mJ/bit achievable at $\eta_T$=1.

Figure 14A:
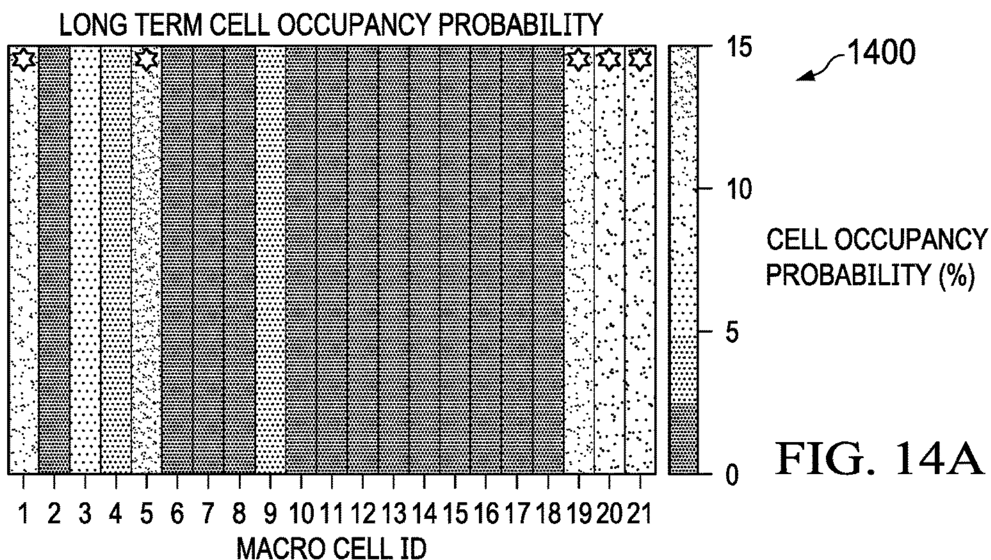
FIG. 14A is a diagram of an average long-term cell occupancy probability of users.
Figure 14B:
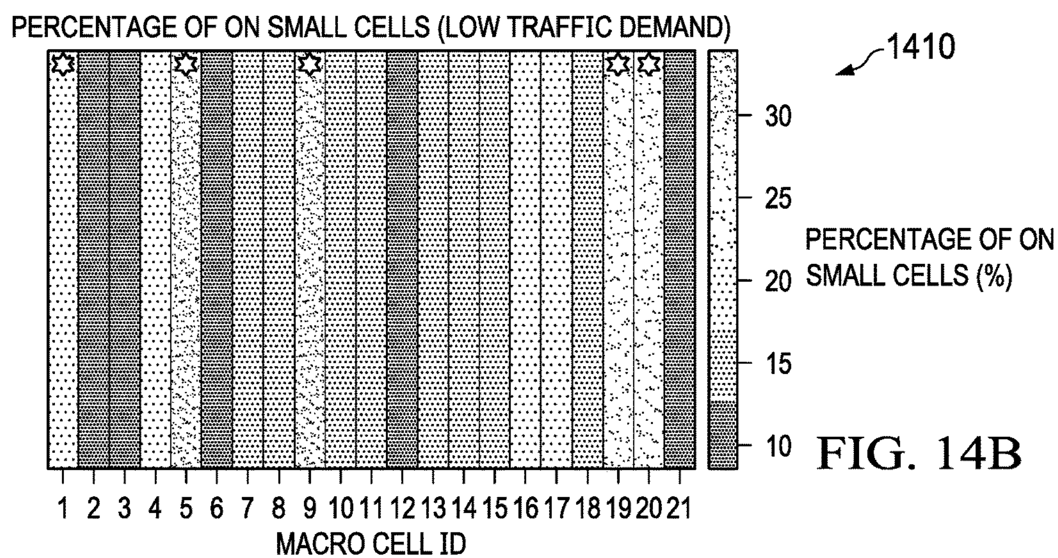
FIG. 14B is a diagram of an average percentage of on small cells with AURORA for a low traffic demand.
Figure 14C:
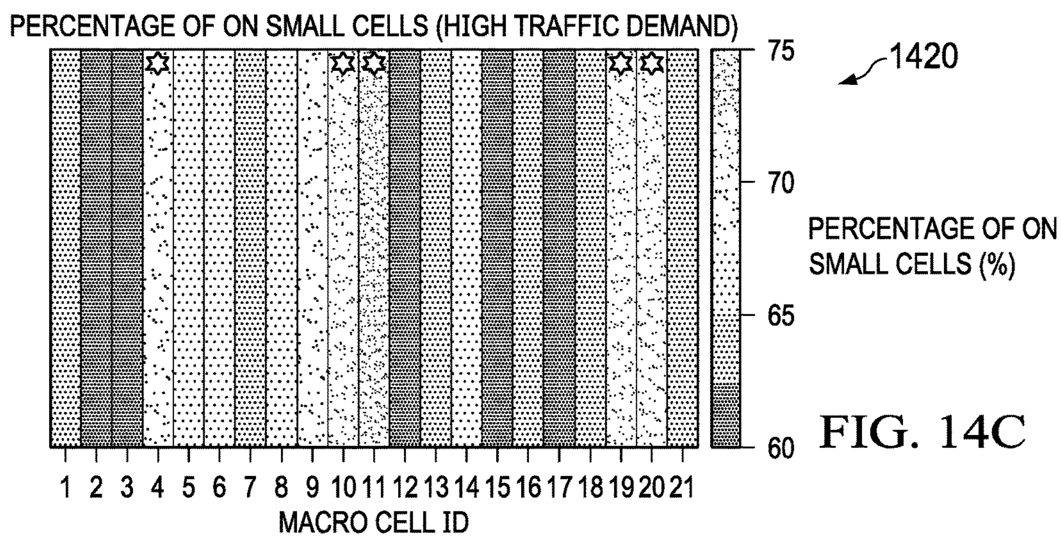
FIG. 14C is a diagram of an average percentage of on small cells with AURORA for a high traffic demand.

FIG. 14A is a diagram 1400 of an average long-term cell occupancy probability of users. FIG. 14B is a diagram 1410 of an average percentage of on small cells with AURORA for a low traffic demand. FIG. 14C is a diagram 1420 of an average percentage of on small cells with AURORA for a high traffic demand. The diagram 1400 is computed using (17-19). As shown, users spend most of their time in macro cells 5, 1, 19, 20 and 21 (denoted by stars). This information can be utilized for validation of AURORA. The diagram 1410 is for a one hour simulation duration. As is evident, more small cells were turned on in macro cells 9, 20, 5, 19 and 1 (denoted by stars). Hence, on average, AURORA kept more small cells switched on in cells where users had a longer sojourn time. Few discrepancies are observed. The difference with macrocell 21 can be attributed to location estimation inaccuracies, as well as rate requirements of UEs in those cells. Thus, even with a higher cell occupancy probability of users in a particular macrocell, if a cumulative rate requirement of UEs is low, then small cells in that macrocell will remain switched off most of the time. The diagram 1420 shows more small cells that are on.

Quantifying Effect of Mobility Prediction Model Inaccuracy on Potential Energy Saving: One can anticipate that the energy saving gain of AURORA will depend on the accuracy of the underlying mobility prediction model. However, that dependence can be analyzed by varying the underlying user mobility model such that it includes a varying degree of randomness and hence predictability. To vary the degree of randomness in the mobility traces, the two key parameters of SLAW, namely variance in pause times and percentage of random waypoints, were changed from default values to larger values to increase randomness in the mobility trajectory of the UEs. Four sets of gradually increasing initialization parameters were used that resulted in increasing randomness in user mobility. The prediction model trained on these four set of traces exhibited average prediction accuracy of 85%, 75%, 65%, and 55%.

FIG. 15 is a graph 1500 of average ERG of AURORA for varying values of prediction accuracy. The graph 1500 considers both AllOn-HomNet and AllOn-HetNet schemes averaged over 1 hour duration for a high traffic demand scenario. As shown, the gain of AURORA decreases with a decrease in prediction accuracy. However, as long as mobility is predictable with 55% or higher accuracy, AURORA continues to yield ERG. Given that typical human mobility features 93% predictability when averaged over a large real user sample space, AURORA is a promising approach. However, human mobility is bound to have some randomness that translates to prediction inaccuracy. The high frequency periodic update aspect of the future location probabilities is one of the possible ways to cope with the prediction inaccuracies as the effect of the prediction inaccuracy is only limited to the prediction interval. Another way is to make it adaptive so that AURORA continuously analyzes its performance and falls back to an AllOn scheme when prediction accuracy drops below 55%. Moreover, selecting top-2 probable locations can also be chosen as a strategy to improve the prediction accuracy, albeit at a cost of reduced ERG.

FIG. 16 is a flowchart illustrating a method 1600 of proactive mobile network optimization according to an embodiment of the disclosure. At step 1610, a prediction model that predicts next cells of UEs in a future time step of a mobile network is built. At step 1620, the next cells are mapped to future user locations. At step 1630, future loads of BSs in the mobile network are determined based on the future user locations. At step 1640, an optimization of the mobile network is determined using the future loads. Finally, at step 1650, the optimization is implemented by instructing the BSs to adjust a parameter in the future time step.

In the method 1600, the prediction model may be built using at least one of handover reports, CDRs, or UE measurements. The UE measurements may comprise at least one of an RSRP, an RSRQ, or an RSS. The next cells may be mapped to the future user locations using most-probable landmarks of the UEs. The next cells may be mapped to the future user locations using at least one of an RSRP, an RSRQ, or an RSS. The future user locations may comprise location coordinates. The location coordinates may be GPS coordinates. The future loads may be numbers of the UEs connected to the BSs. The future loads may be the fraction of the total resources in the cell required to achieve required rate of all users of a cell. The optimization may be for energy saving. The parameters may be an on/off state with CIO. The optimization may be for load balancing. The parameter may be at least one of an antenna tilt, an antenna azimuth, an antenna beam width, CIO, or an antenna transmission power. A C-SON controller may implement the method 1600.

Figure 17:
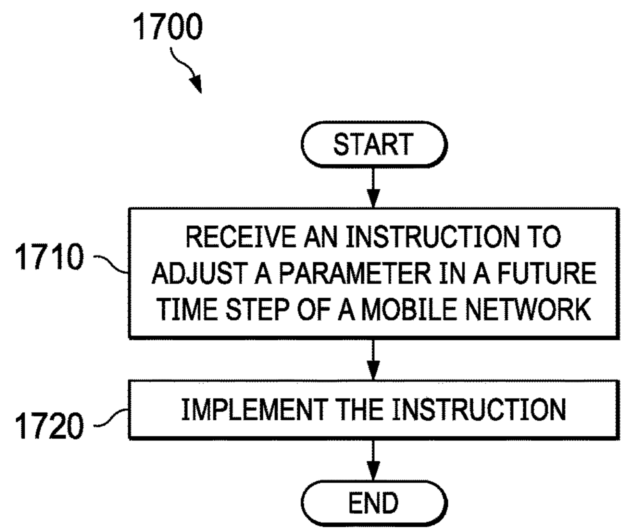
FIG. 17 is a flowchart illustrating a method of proactive mobile network optimization according to another embodiment of the disclosure.

FIG. 17 is a flowchart illustrating a method 1700 of proactive mobile network optimization according to another embodiment of the disclosure. ABS may implement the method 1700. At step 1710, an instruction to adjust a parameter in a future time step of a mobile network is received. The instruction is based on a predicted next cell of a UE in a future time step. The parameter is at least one of an on/off state, an antenna tilt, an antenna azimuth, an antenna beam width, CIO, or an antenna transmission power. Finally, at step 1720, the instruction is implemented. For instance, the parameter is adjusted.

Figure 18:
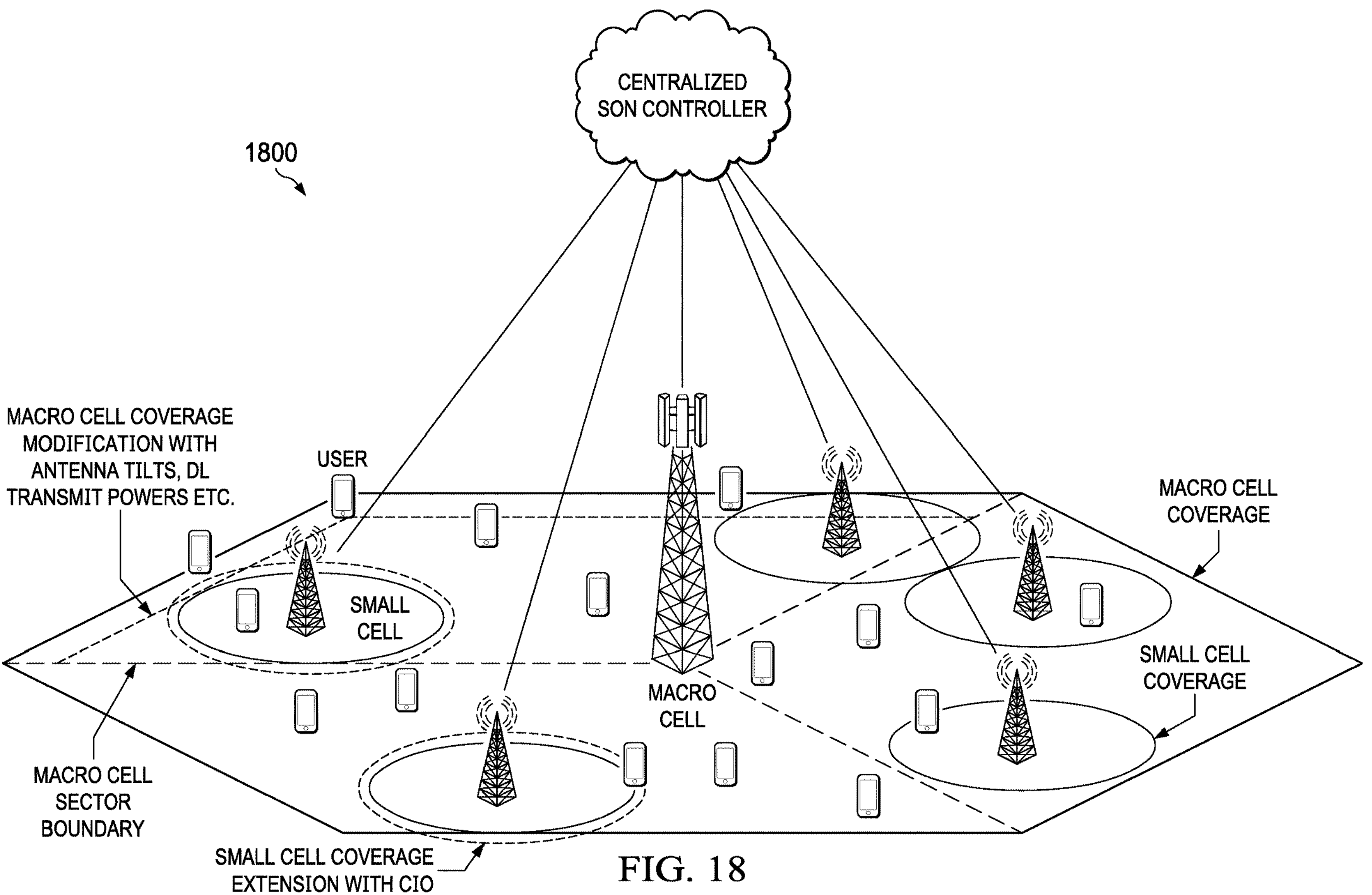
FIG. 18 is a schematic of a SON.

FIG. 18 is a schematic of a SON 1800. As shown, the SON 1800 comprises a C-SON controller, macro cells, and single cells.

Figure 19:
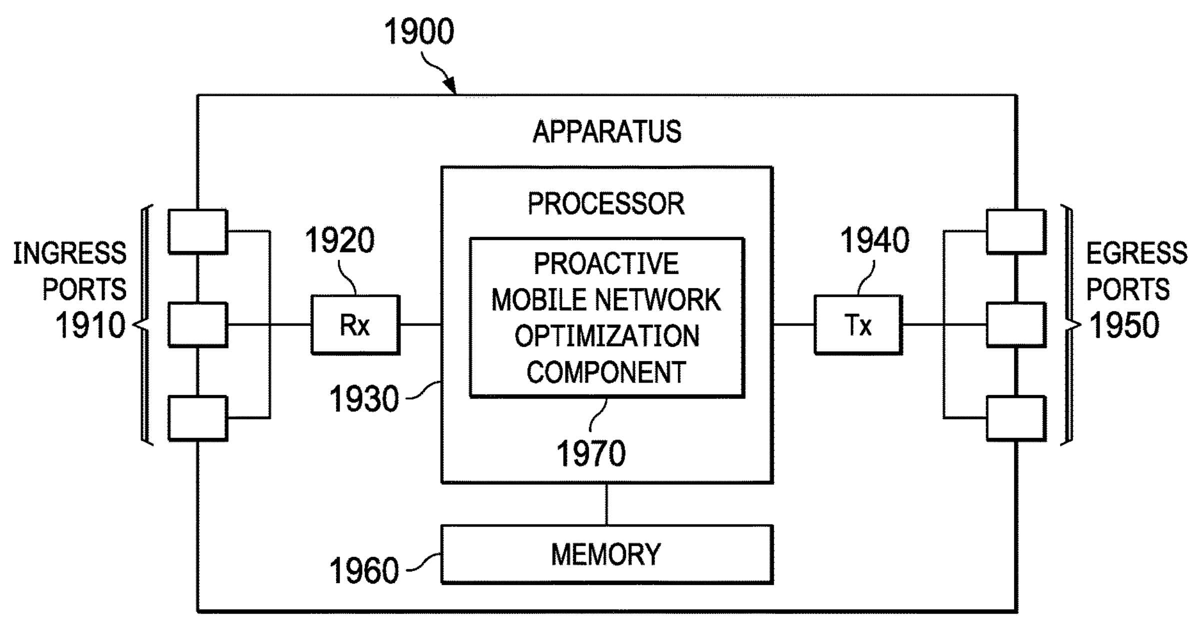
FIG. 19 is a schematic diagram of an apparatus according to an embodiment of the disclosure.

FIG. 19 is a schematic diagram of an apparatus 1900 according to an embodiment of the disclosure. The apparatus 1900 may implement the disclosed embodiments. The apparatus 1900 comprises ingress ports 1910 and an RX 1920 to receive data; a processor, logic unit, baseband unit, or CPU 1930 to process the data; a TX 1940 and egress ports 1950 to transmit the data; and a memory 1960 to store the data. The apparatus 1900 may also comprise OE components, EO components, or RF components coupled to the ingress ports 1910, the RX 1920, the TX 1940, and the egress ports 1950 to provide ingress or egress of optical signals, electrical signals, or RF signals.

The processor 1930 is any combination of hardware, middleware, firmware, or software. The processor 1930 comprises any combination of one or more CPU chips, cores, FPGAs, ASICs, or DSPs. The processor 1930 communicates with the ingress ports 1910, the RX 1920, the TX 1940, the egress ports 1950, and the memory 1960. The processor 1930 comprises a proactive mobile network optimization component 1970, which implements the disclosed embodiments. The inclusion of the proactive mobile network optimization component 1970 therefore provides a substantial improvement to the functionality of the apparatus 1900 and effects a transformation of the apparatus 1900 to a different state. Alternatively, the memory 1960 stores the proactive mobile network optimization component 1970 as instructions, and the processor 1930 executes those instructions.

The memory 1960 comprises any combination of disks, tape drives, or solid-state drives. The apparatus 1900 may use the memory 1960 as an over-flow data storage device to store programs when the apparatus 1900 selects those programs for execution and to store instructions and data that the apparatus 1900 reads during execution of those programs, for instance as a computer program product. The memory 1960 may be volatile or non-volatile and may be any combination of ROM, RAM, TCAM, or SRAM.

A computer program product may comprise computer-executable instructions stored on a non-transitory medium, for instance the memory 1960, that when executed by a processor, for instance the processor 1930, cause an apparatus to perform any of the embodiments.

The embodiments can be applied to heterogeneous networks having any kinds of cells, including femto, pico, micro and macro. It can easily be adapted to networks with only a few of these cell types available.

The method may be executed by a centralized entity (for example a SON server), so there will be signaling between this entity and the BSs. In order to avoid introducing unnecessary control overheads into the network, optimization parameter values can be forwarded subject to change in the optimization parameters. In that case, BSs can continue to use the configuration values until a new update is passed by the SON engine.

The description may not consider the case where macro cells are deactivated during low traffic periods because it is assumed that the basic coverage of the network is provided by all of the macro cells with the small cells used in certain areas for capacity boosting purposes. If under some circumstances where operators wished to switch off macro cells, then the embodiments can be applied with minor modifications. That assumes that all the cells are of the same RAT. It is not necessary, however, for the macro and small cells to use the same RAT. The RAT for each of them could be any kind, for instance 5G or another kind.

The embodiments utilize a semi-Markov based model for spatiotemporal mobility prediction. However, any other technique such as deep learning, support vector machine, neural networks, or decision trees can be used for mobility prediction. One possibility is to apply deep neural networks.

The embodiment utilizes CIOs, on/off states, antenna parameters (tilts, azimuths, beam widths, transmission power) as optimization variables. However, the embodiments are not limited to only these particular optimization variables. Any combination of these or other parameters can also be used as optimization variables.

The embodiments use RSRP and CIO with and without load-based user association. However, any other association metric, for instance a weighed combination of RSRP, CIO, and ECR of BSs, can be used without any other changes into the proposed framework.

The embodiments use RSRP for downlink coverage component in the user association. However, any other association metric such as RSRQ or CQI can be used interchangeably with RSRP. UIO can also be incorporated in determining the user association function.

The embodiments use ECR and a logarithmic sum of idle resources as optimization objectives. However, the embodiments are not limited to these objective functions. Any other suitable objective function can also be used without any other changes into the proposed framework.

The embodiments use energy saving and load balancing as self-optimization functions. However, the embodiments are not limited to these objective functions. Other SON use cases like MRO and eICIC can be transformed from reactive to proactive using the embodiments.

The embodiments use a genetic algorithm as a heuristic optimization for solving the optimization problem for the estimated network state predictively ahead of time. However, any other technique like particle swarm, pattern search, or sequential quadratic programming can also be used without any changes into the proposed framework.

The embodiments consider either an on state or an off state for small cells, but the embodiments can be applied to any number of classes of states such as completely off, deep sleep, partial sleep, or completely on.

The embodiments consider a two-tier network for illustration purpose. However, the embodiments are applicable to any k-tier network where $k>0$.

The embodiments leverage mobility prediction for estimation of future loads. In addition, historical cell load information (load forecasting) can be used to further improve prediction accuracy.

In an embodiment, a method for proactive self-organization (self-optimization) of a mobile cellular network based on user mobility prediction comprising: building a mobility prediction model for users using minimalistic network data that is already generated in network; predicting cell of next handover and time of next handover for the users at each time step; determining most probable landmarks visited by each user in each cell using their historical mobility patterns; estimating future location coordinates of the users for next time step; estimating channel information at future estimated location of the users using channel maps for next time step; and optimizing network configuration parameters (self-optimization) for next time step. The on/off states and cell individual offset (CIO) values for all the cells for next time step may be optimized such that energy consumption of the whole network is minimized. The configuration of antenna parameters (tilts, Azimuths, beam widths, transmit power) and CIOs for next time step may be optimized such that load balancing is achieved. A semi-Markov renewal process may be leveraged for building mobility prediction model for the users. A user association may be a function of at least one of a cell load, a downlink (DL) received power, cell individual offset (CIO), and a power consumption status.

In a first embodiment, an apparatus comprises: a memory; and a processor coupled to the memory and configured to: build a prediction model that predicts next cells of UEs in a future time step of a mobile network; map the next cells to future user locations; determine future loads of BSs in the mobile network based on the future user locations; determine an optimization of the mobile network using the future loads; and implement the optimization by instructing the BSs to adjust a parameter in the future time step. The processor is further configured to build the prediction model using at least one of handover reports, CDRs, or UE measurements. The UE measurements comprise at least one of an RSRP, an RSRQ, or an RSS. The processor is further configured to map the next cells to the future user locations using most-probable landmarks of the UEs. The processor is further configured to map the next cells to the future user locations using at least one of an RSRP, an RSR, or an RSS. The future user locations comprise location coordinates. The location coordinates are GPS coordinates. The future loads are the fraction of the total resources in the cells required to achieve required rate of all users of those cells. The optimization is for energy saving. The parameter is an on/off state and CIO. The optimization is for load balancing. The parameter is at least one of an antenna tilt, an antenna azimuth, an antenna beam width, or an antenna transmission power. The apparatus is a C-SON controller.

In a fourteenth embodiment, a method comprises: building a prediction model that predicts next cells of UEs in a future time step of a mobile network; mapping the next cells to future user locations; determining future loads of BSs in the mobile network based on the future user locations; determining an optimization of the mobile network using the future loads; and implementing the optimization by instructing the BSs to adjust a parameter in the future time step. The optimization is for energy saving, and wherein the parameter is an on/off state. The optimization is for load balancing, and wherein the parameter is at least one of an antenna tilt, an antenna azimuth, an antenna beam width, or an antenna transmission power.

In a seventeenth embodiment, a UE comprises: a receiver configured to receive an instruction to adjust a parameter in a future time step of a mobile network, wherein the instruction is based on a predicted next cell of the UE in a future time step, and wherein the parameter is at least one of an on/off state, an antenna tilt, an antenna azimuth, an antenna beam width, or an antenna transmission power; and a processor coupled to the receiver and configured to implement the instruction. The instruction is further based on a future user location of the UE that is associated with the next cell.

In a nineteenth embodiment, a method comprises: receiving an instruction to adjust a parameter in a future time step of a mobile network, wherein the instruction is based on a predicted next cell of a UE in a future time step, and wherein the parameter is at least one of an on/off state, an antenna tilt, an antenna azimuth, an antenna beam width, or an antenna transmission power; and implementing the instruction. The instruction is further based on a future user location of the UE that is associated with the next cell.

Any of the embodiments above may be combined to form a new embodiment.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
- a memory; and
- a processor coupled to the memory and configured to:
  - build a prediction model that predicts next cells of user equipments (UEs) in a future time step of a mobile network, wherein the prediction model is a semi-Markov model based on user sojourn times in cells and based on next cell handover times;
  - map the next cells to future user locations that comprise location coordinates;
  - determine future loads of base stations (BSs) in the mobile network based on the future user locations;
  - determine an optimization of the mobile network using the future loads; and
  - implement the optimization by instructing the BSs to adjust a parameter in the future time step.

2. The apparatus of claim 1, wherein the processor is further configured to build the prediction model using at least one of handover reports, call detail records (CDRs), or UE measurements.

3. The apparatus of claim 2, wherein the UE measurements comprise at least one of a reference signal received power (RSRP), a reference signal received quality (RSRQ), or a received signal strength (RSS).

4. The apparatus of claim 1, wherein the processor is further configured to map the next cells to the future user locations using most-probable landmarks of the UEs.

5. The apparatus of claim 1, wherein the processor is further configured to map the next cells to the future user locations using at least one of a reference signal received power (RSRP), a reference signal received quality (RSRQ), or a received signal strength (RSS).

6. The apparatus of claim 1, wherein the location coordinates are Global Positioning System (GPS) coordinates.

7. The apparatus of claim 1, wherein the future loads are a fraction of total resources in cells required to achieve a required rate of all users of those cells.

8. The apparatus of claim 1, wherein the optimization is for energy saving.

9. The apparatus of claim 8, wherein the parameter is an on/off state and cell individual offset (CIO).

10. The apparatus of claim 1, wherein the optimization is for load balancing.

11. The apparatus of claim 10, wherein the parameter is at least one of an antenna tilt, an antenna azimuth, an antenna beam width, or an antenna transmission power.

12. The apparatus of claim 1, wherein the apparatus is a centralized self-organizing network (C-SON) controller.

13. The apparatus of claim 1, wherein the processor is further configured to further implement the optimization by instructing switching off of underutilized small cells.

14. A method comprising:
- building a prediction model that predicts next cells of user equipments (UEs) in a future time step of a mobile network, wherein the prediction model is a semi-Markov model based on user sojourn times in cells and based on next cell handover times;
- mapping the next cells to future user locations that comprise location coordinates;

determining future loads of base stations (BSs) in the mobile network based on the future user locations;

determining an optimization of the mobile network using the future loads; and implementing the optimization by instructing the BSs to adjust a parameter in the future time step.

15. The method of claim 14, wherein the optimization is for energy saving, and wherein the parameter is an on/off state and cell individual offset (CIO).

16. The method of claim 14, wherein the optimization is for load balancing, and wherein the parameter is at least one of an antenna tilt, an antenna azimuth, an antenna beam width, or an antenna transmission power.

17. The method of claim 14, further comprising building the prediction model using at least one of handover reports, call detail records (CDRs), or UE measurements.

18. The method of claim 17, wherein the UE measurements comprise at least one of a reference signal received power (RSRP), a reference signal received quality (RSRQ), or a received signal strength (RSS).

19. The method of claim 14, further comprising mapping the next cells to the future user locations using most-probable landmarks of the UEs.

20. The method of claim 14, further comprising mapping the next cells to the future user locations using at least one of a reference signal received power (RSRP), a reference signal received quality (RSRQ), or a received signal strength (RSS).

21. A computer program product comprising instructions that are stored on a non-transitory computer-readable medium and that, when executed by a processor, cause an apparatus to:

build a prediction model that predicts next cells of user equipments (UEs) in a future time step of a mobile network, wherein the prediction model is a semi-Markov model based on user sojourn times in cells and based on next cell handover times;

map the next cells to future user locations that comprise location coordinates;

determine future loads of base stations (BSs) in the mobile network based on the future user locations;

determine an optimization of the mobile network using the future loads; and implement the optimization by instructing the BSs to adjust a parameter in the future time step.

* * * * *